US012583239B2

(12) United States Patent
Hara et al.

(10) Patent No.: US 12,583,239 B2
(45) Date of Patent: Mar. 24, 2026

(54) RECORDING APPARATUS, CONTROL METHOD, AND STORAGE MEDIUM

(71) Applicant: CANON KABUSHIKI KAISHA, Tokyo (JP)

(72) Inventors: Tomoya Hara, Kanagawa (JP); Takahiro Kiuchi, Tokyo (JP); Masaaki Matsuura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 18/376,080

(22) Filed: Oct. 3, 2023

(65) Prior Publication Data

US 2024/0109344 A1 Apr. 4, 2024

(30) Foreign Application Priority Data

Oct. 4, 2022 (JP) ................................ 2022-160335

(51) Int. Cl.
*B41J 11/00* (2006.01)
*B41J 11/42* (2006.01)
(Continued)

(52) U.S. Cl.
CPC ............ *B41J 11/42* (2013.01); *B41J 11/0045* (2013.01); *B41J 11/0095* (2013.01);
(Continued)

(58) Field of Classification Search
CPC ..... B41J 11/42; B41J 11/0045; B41J 11/0095; B41J 13/0018; B41J 13/0036;
(Continued)

(56) References Cited

U.S. PATENT DOCUMENTS 7,677,554 B2 3/2010 Yoshihisa et al.
10,857,819 B2 12/2020 Hattori et al.
(Continued)

FOREIGN PATENT DOCUMENTS

EP 1 473 168 A1 11/2004
JP 4-298368 A 10/1992
(Continued)

OTHER PUBLICATIONS

U.S. Appl. No. 18/376,176, filed Oct. 3, 2023, Takahiro Kiuchi, Tomoya Hara, Masaaki Matsuura.
Extended European Search Report dated Mar. 13, 2024, in European Patent Application No. 23199069.8.
Japanese Office Action dated May 21, 2024, in Japanese Patent Application No. 2022-160335.
(Continued)

*Primary Examiner* — Yaovi M Ameh
(74) *Attorney, Agent, or Firm* — Venable LLP

(57) ABSTRACT

A recording apparatus includes a conveyance path through which a recording medium is caused to pass from an upstream side to a downstream side in a conveyance direction; a conveying unit disposed on the conveyance path and configured to convey a recording medium; a detecting unit configured to detect an edge of a recording medium in the conveyance path; and a control unit configured to execute first control for conveying a recording medium toward the upstream side with the conveying unit and second control for conveying the recording medium toward the downstream side with the conveying unit. After the detecting unit detects a trailing edge of a recording medium, the control unit executes the first control or the second control based on a position of the trailing edge of the recording medium.

19 Claims, 17 Drawing Sheets

(51) Int. Cl.

| | |
|---|---|
| ***B41J 13/00*** | (2006.01) |
| ***B41J 29/393*** | (2006.01) |
| ***B65H 7/14*** | (2006.01) |
| ***B65H 29/12*** | (2006.01) |
| *B65H 3/06* | (2006.01) |

(52) U.S. Cl.
CPC ....... *B41J 13/0018* (2013.01); *B41J 13/0036* (2013.01); *B41J 29/393* (2013.01); *B65H 29/125* (2013.01); *B65H 3/06* (2013.01); *B65H 7/14* (2013.01); *B65H 2403/942* (2013.01); *B65H 2701/1313* (2013.01)

(58) Field of Classification Search
CPC .. B41J 29/393; B65H 29/125; B65H 2402/46; B65H 2403/942; B65H 2404/6111; B65H 2701/1313; B65H 2801/12; B65H 2801/15; B65H 5/062; B65H 5/38; B65H 3/06; B65H 7/10; B65H 7/14; B65H 2701/1131; B65H 2801/03
See application file for complete search history.

(56) References Cited

U.S. PATENT DOCUMENTS

| | | | | |
|---|---|---|---|---|
| 11,198,576 | B2 | 12/2021 | Matsuo et al. | |
| 2009/0079124 | A1 * | 3/2009 | Yoshihisa | ............ B41J 13/0009 271/3.14 |
| 2023/0294426 | A1 | 9/2023 | Sugiyama et al. | |

FOREIGN PATENT DOCUMENTS

| | | | | |
|---|---|---|---|---|
| JP | 2000-272781 | A | 10/2000 | |
| JP | 2002332142 | A * | 11/2002 | ............... B65H 9/14 |
| JP | 2004-323220 | A | 11/2004 | |
| JP | 2005-075526 | A | 3/2005 | |
| JP | 2009-196809 | A | 9/2009 | |

OTHER PUBLICATIONS

Office Action dated Mar. 18, 2025, in Japanese Patent Application No. 2022-160335.

* cited by examiner

FIG.13
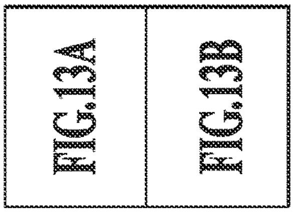
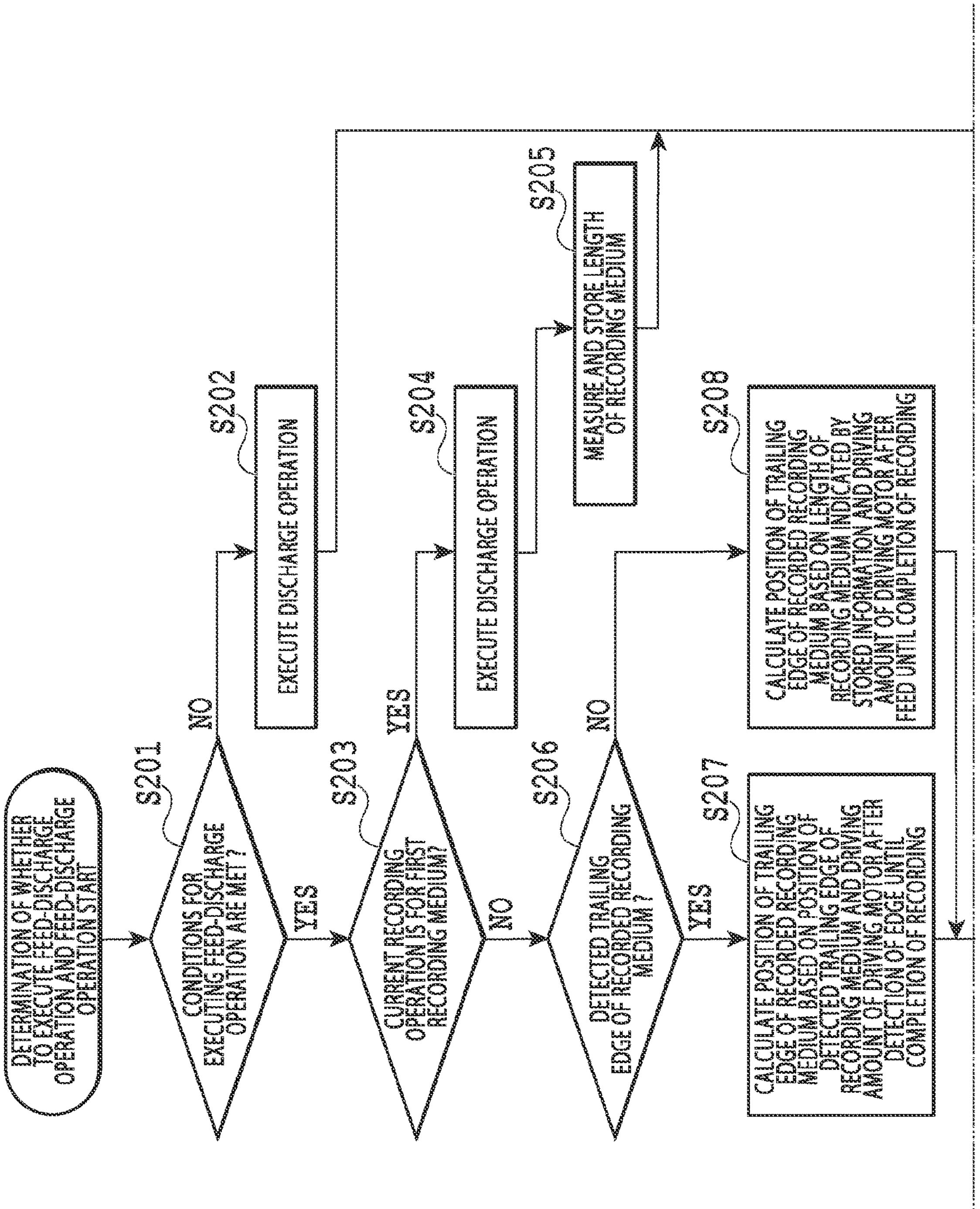
FIG.13A

RECORDING APPARATUS, CONTROL METHOD, AND STORAGE MEDIUM

BACKGROUND

Field

The present disclosure relates to a technique for separating and individually conveying recording media, such as sheets, in a recording apparatus.

Description of the Related Art

Heretofore, there exists a feeding device that separates and individually feeds recording media as a device included in a recording apparatus. Such feeding devices include an automatic feeding device that performs an operation of returning to a ready position after the completion of a feed operation (hereinafter referred to as "feed preparation operation") by reversing the direction of rotational driving of a driving source with a missing-tooth gear and the like used as a transmitting unit coupled to the feeding device. Besides such an automatic feeding device, there are automatic feeding devices that move a recording medium backward for positioning of the recording medium or another purpose. Moreover, there are automatic feeding devices employing a configuration in which a driving source for a feeding device as described above is used also as a driving source for a conveying device that conveys a recording medium to a recording unit located downstream of the feeding device in the conveyance direction in order to reduce the apparatus' size and cost.

Recording apparatuses including this type of automatic feeding device include one that, in a case of performing recording on multiple recording media, performs what is called a feed-discharge operation in which, before the completion of discharge of a recording medium subjected to recording, the recording medium to be subjected to the next recording is fed out of the automatic feeding device in order to shorten the time required for the recording.

This recording apparatus needs to perform the feed preparation operation while the recording medium subjected to recording is still remaining in the conveying device's conveyance path, in order to feed the recording medium to be subjected to the next recording out of the feeding device in the feed-discharge operation. However, in the case where the conveying device and the feeding device share the same driving source as mentioned above, switching the driving direction of the driving source in a, feed preparation operation or the like may result in pulling a recording medium remaining in the conveying device's conveyance path into the feeding device side from the conveying device side. This leads to a problem that, depending on the position of the remaining recording medium, an edge of the recording medium gets caught on a guide member or a conveying roller in the conveyance path, causing a paper jam or the like.

To address the above problem, Japanese Patent Laid-Open No. 2002-332142 discloses a method that prevents a paper jam by performing a feed preparation operation after completely discharging a recording medium subjected to recording out of a conveying device.

SUMMARY

However, in Japanese Patent Laid-Open No. 2002-332142, a feed-discharge operation cannot be performed while a recording medium subjected to recording is remaining inside the conveying device. This leads to a problem of increasing the time required for a recording operation. In view of the above problem, an object of the present disclosure is to achieve bath shortening of the time required for a recording operation and prevention of conveyance abnormality such as a paper jam.

An embodiment of the present disclosure is a recording apparatus including: a conveyance path through which a recording medium is caused to pass from an upstream side to a downstream side in a conveyance direction; a conveying unit disposed on the conveyance path and configured to convey a recording medium; and a control unit configured to execute first control for conveying a recording medium toward the upstream side with the conveying unit and second control for conveying the recording medium toward the downstream side with the conveying unit, in which the control unit permits execution of the first control in a case where a position of a trailing edge of a recording medium is situated within a first region in the conveyance path, and executes the second control in a case where the position of the trailing edge of the recording medium is situated within a second region in the conveyance path different from the first region.

Further features of the present invention will become apparent from the following description of exemplary embodiments with reference to the attached drawings.

BRIEF DESCRIPTION OF THE DRAWINGS

FIG. 13 is a diagram showing the relationship of FIGS. 13A and 13B;

FIGS. 13A and 13B are flowcharts of a feed-discharge operation;

DESCRIPTION OF THE EMBODIMENTS

Figure 1:
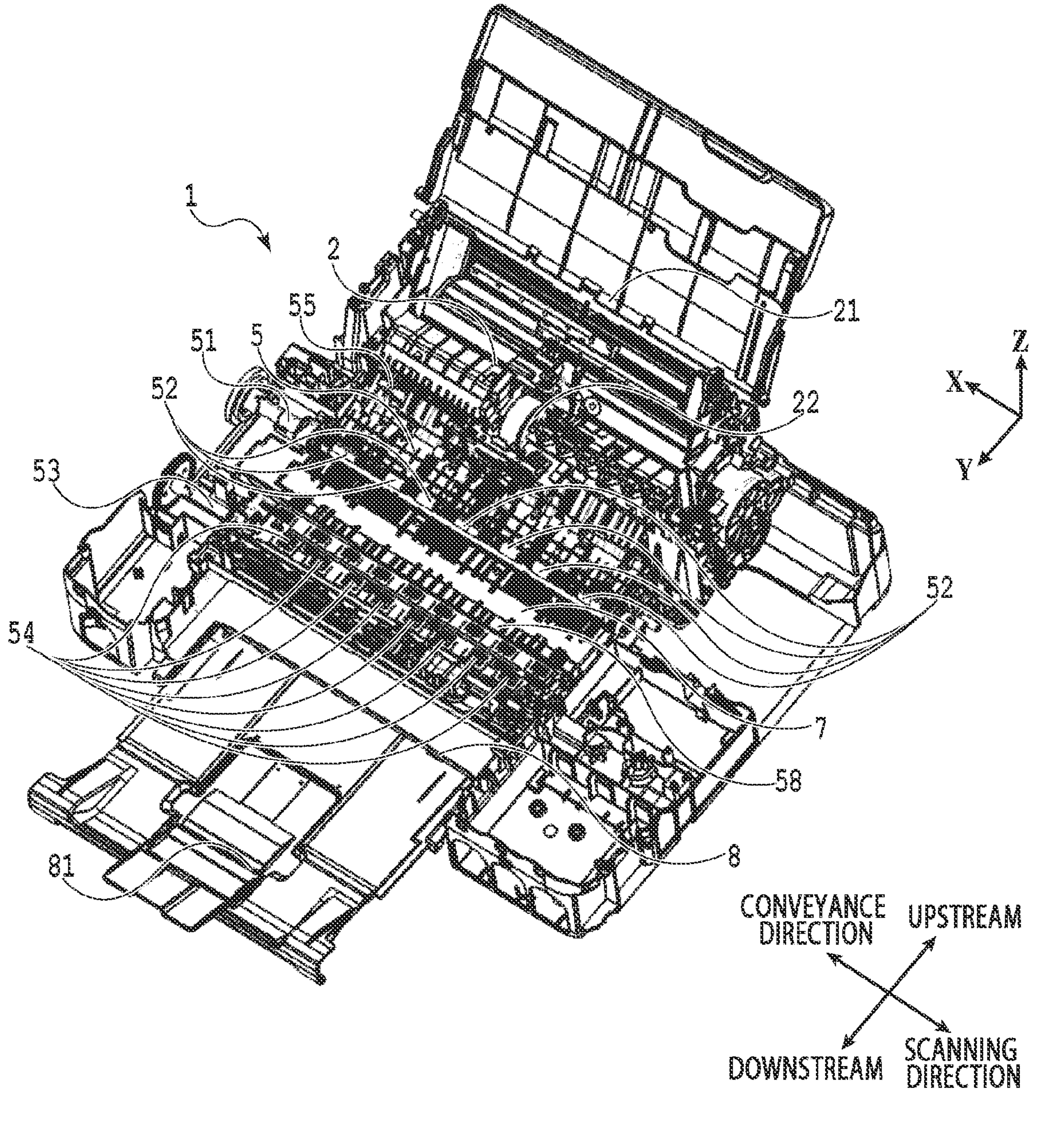
FIG. 1 is a perspective view illustrating an outer appearance of an inkjet recording apparatus.

An embodiment will be specifically described below with reference to the accompanying drawings. The following embodiment is not intended to limit the invention according to the claims more than necessary. Moreover, although multiple features are described in the following embodiment, not all of these features are necessarily essential to implement the concept of the present disclosure, and the multiple features may be combined in any ways. Furthermore, in the accompanying drawings, the same or similar components are denoted by the same reference numeral, and overlapping description may be omitted.

The term "record" herein does not represent only formation of information with a meaning, such as a character or a figure. Moreover, the term "record" is not limited by whether what is to be "recorded" has a meaning or not, or is elicited so as to be visually perceptible to humans, and represents a wide range of meanings such as formation of an image, a design, a pattern, or the like on a recording medium and processing a medium. Note that "recording" may also be expressed as "printing".

Also, the term "recording medium (sheet)" not only includes recording paper used by general image forming apparatuses but widely includes any media which recording apparatuses can convey, such as fabric, plastic film (overhead projector (OHP) film), sheet metal, glass, ceramic, wood, and leather.

First Embodiment

<Schematic Configuration of Inkjet Recording Apparatus>

First, an inkjet recording apparatus (hereinafter referred to simply as "recording apparatus") according to a first embodiment will be briefly discussed.

FIG. 1 is a perspective view generally illustrating the recording apparatus according to the present embodiment. A recording apparatus 1 has a feeding unit 2 which separates and individually feeds loaded recording media, a conveying unit 5 which conveys the recording media fed by the feeding unit 2, and a recording unit 7. The recording apparatus 1 also has a driving motor 6 (not illustrated in FIG. 1; see FIG. 6) and a discharging unit 8 on which to discharge and stack the recording media after recording by the recording unit 7.

The feeding unit 2 has a loading unit 21 on which to load recording media, and a feeding roller 22 which feeds the recording media loaded on the loading unit 21. The conveying unit 5 has a conveying roller 51, pinching rollers 52 facing the conveying roller 51, a discharging roller 53, and conveying spur rollers 54 facing the discharging roller 53. The discharging unit 8 has a discharge tray 81 on which to stack recording media discharged by the discharging roller 53.

Each recording medium fed by the feeding roller 22 from the feeding unit 2 is nipped by the conveying roller 51 and the pinching rollers 52 biased toward the conveying roller 51 by a pinching-roller holder 55 and conveyed to the recording unit 7. The recording medium conveyed to the recording unit 7 is subjected to image recording with inks ejected thereto from nozzles (not illustrated) in a recording head (not illustrated). The recording unit 7 can perform a recording operation at any positions on the recording medium in the X direction (referred to also as "recording-medium width direction") by causing the recording head to reciprocally move along the scanning direction in FIG. 1. The recording medium after the image recording by the recording unit 7 is discharged onto the discharge tray 81 by the discharging roller 53 and the conveying spur rollers 54 serving as a discharging unit. Incidentally, in the conveyance path from the feeding unit 2 through the conveying unit 5 to the discharging unit 8, the feeding unit 2 side will be referred to as "upstream (side)" in the conveyance direction and the discharging unit 8 side will be referred to as "downstream (side)" in the conveyance direction.

The drive of the driving motor 6 is coupled to the conveying roller 51, the discharging roller 53, and the feeding unit 2 by a gear train (not illustrated) to rotationally drive them. Incidentally, the direction of rotation of the conveying roller 51 by the driving force of the driving motor 6 in a case of conveying a recording medium toward the downstream side will be referred to as "forward direction". The direction of rotation of the conveying roller 51 in a case of conveying a recording medium toward the upstream side will be referred to as "backward direction".

The pinching-roller holder 55 is disposed on an upper side (+Z side) in FIG. 1 relative to the conveyance path for recording media between the feeding unit 2 and the conveying unit 5, and a guiding unit 56 (not illustrated) is disposed on a lower side (−Z side) relative to the conveyance path. Each of these guides a recording medium conveyed thereto. Also, a platen 58 is disposed on a lower side (−Z side) in FIG. 1 relative to the conveyance path for recording media between the conveying roller 51 and the discharging roller 53, and guides a recording medium conveyed to the recording unit 7 so as to maintain a constant distance between the recording medium and the nozzles.

<Configuration of Feeding Unit>

Figure 2:
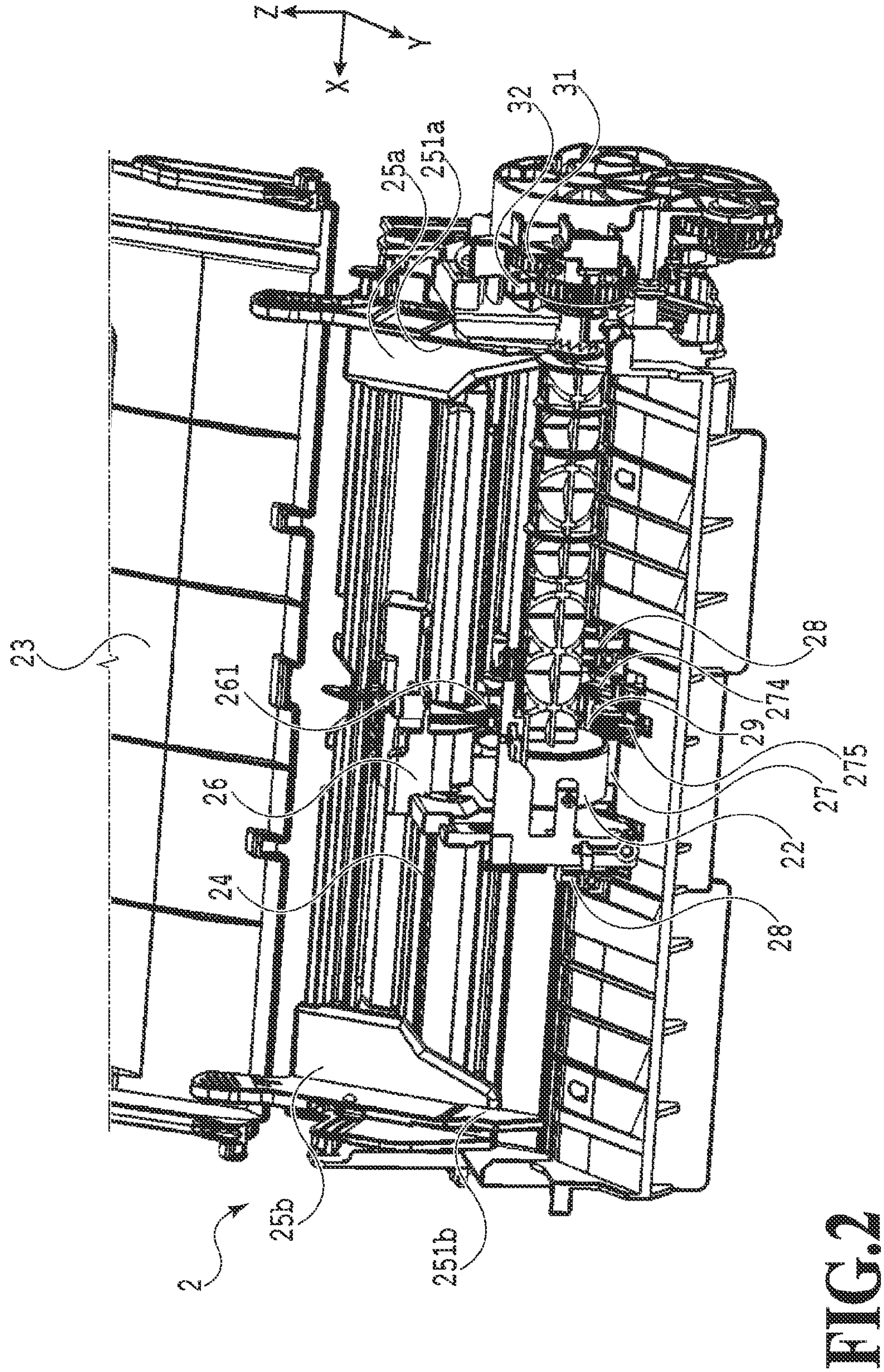
FIG. 2 is a perspective view of a feeding unit.
Figure 3:
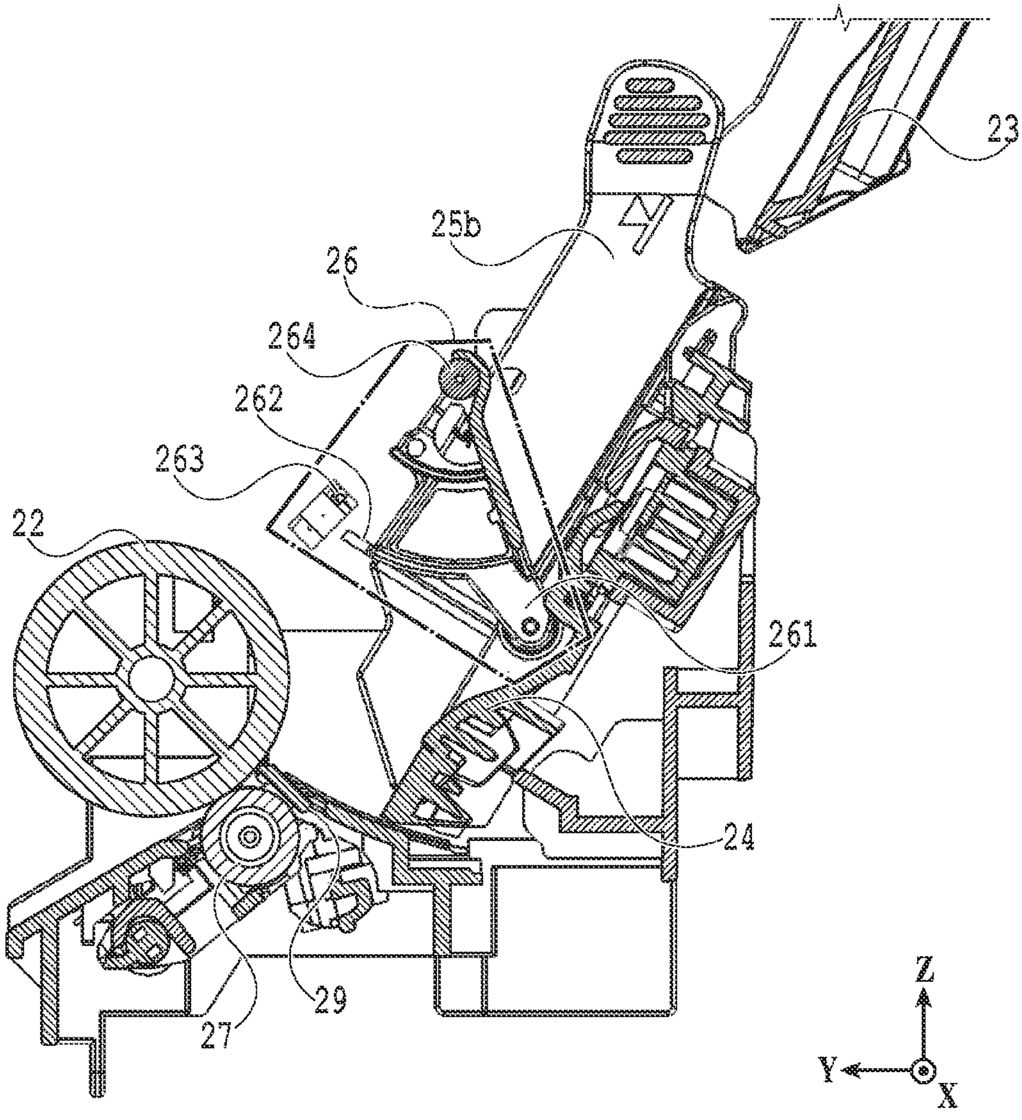
FIG. 3 is a cross-sectional view of the feeding unit.

FIG. 2 is a perspective view of the feeding unit 2. FIG. 3 is a cross-sectional view of the feeding unit 2 as seen from the X direction. The feeding unit 2 includes a recording-medium loading unit, a feeding-separating unit, and a driving unit.

The recording-medium loading unit includes a tray 23, a pressing plate 24, side guides 25*a* and 25*b*, and a loading detecting unit 26. The pressing plate 24 is a pressurizing plate that applies a conveying force to a recording medium. The pressing plate 24 is rotationally biased toward the feeding roller 22 by a pressing-plate spring (not illustrated), and is rotationally moved in a direction away from the feeding roller 22 as a cam provided to the driving unit pushes the pressing plate 24. These biasing and separating operations enable an operation of feeding a recording medium.

The pressing plate 24 is fixed at a predetermined position spaced from the feeding roller 22 in a case where the feeding unit 2 is in a state of not feeding a recording median, or a so-called standby state. A gap large enough to load multiple recording media is provided between the feeding roller 22 and the pressing plate 24 in this predetermined position.

Figure 4:
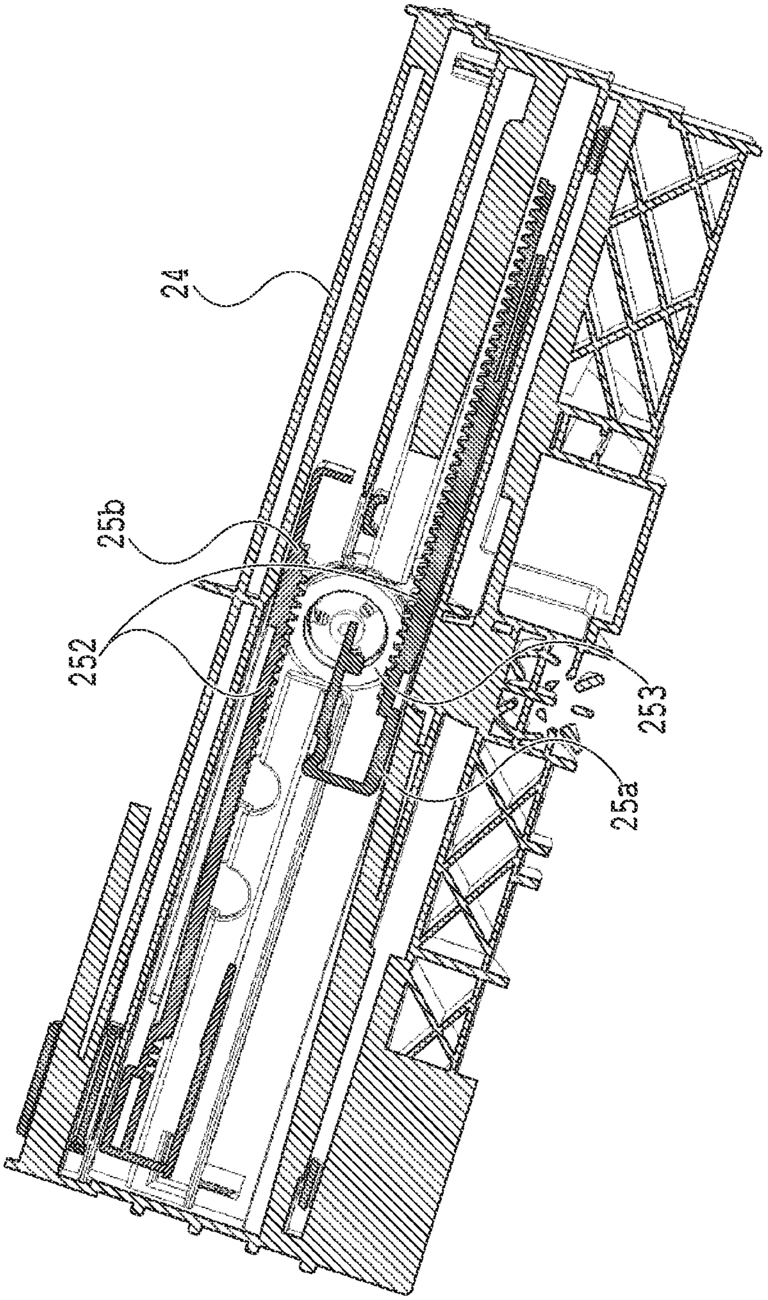
FIG. 4 is a cross-sectional view of a pressing plate in a direction parallel to its recording-medium loading surface.

FIG. 4 is a cross-sectional view of the pressing plate 24 in a direction parallel to its recording-medium loading surface. The side guides 25*a* and 25*b* are slidably attached to the pressing plate 24, and rack parts 252 provided to the side guides 25*a* and 25*b* and a side-guide gear 253 are coupled to allow the side guides 25*a* and 25*b* to move together. The side-guide gear 253 is biased perpendicularly to its rotation direction by a side-guide spring (not illustrated). In this way, the side guides 25*a* and 25*b* operate only in a case of receiving an operation force of a certain degree or higher, and are locked so as not to be unexpectedly moved by the biasing and separating operations of the pressing plate 24, vibration caused by the driving source, moving of the recording apparatus by the user, or the like.

After multiple recording media are loaded in the gap between the feeding roller 22 and the pressing plate 24, the side guides 25*a* and 25*h* are moved to be adjusted to the width of the recording media so that restricting surfaces 251*a* and 251*b* of the side guides 25*a* and 25*b* restrict the sides of the recording media in the width direction. As a result, the loaded recording media are restricted from moving in a direction orthogonal to the recording-medium conveyance direction (recording-medium width direction). This makes it possible to adjust to any recording-medium width within a predetermined width range, and to stably feed recording media with different widths.

As illustrated in FIG. 3, the loading detecting unit 26 includes a loading detecting lever 261 and an optical sensor 263 that functions as a later-described loading detecting sensor 808 (see FIG. 11). The loading detecting lever 261 is rotatably disposed at an upper portion of the pressing plate 24, and is biased toward the pressing plate 24 by a loading detecting spring 264. The loading detecting lever 261 is a molded member that does not transmit infrared rays, and a flag portion 262 thereof passes between a light emitting unit and a light receiving unit of the optical sensor 263 to change the output of the optical sensor 263. This makes it possible to detect the position of the loading detecting lever 261. With no recording medium loaded on the loading unit 21, the flag portion 262 is situated outside the gap between the light emitting unit and the light receiving unit of the optical sensor 263, so that the sensor output is OFF. With one or more recording media loaded on the loading unit 21, the tip of the loading detecting lever 261 and the loaded recording media abut on each other, causing the loading detecting lever to pivot. As a result, the flag portion 262 is situated between the light emitting unit and the light receiving unit of the optical sensor 263, so that the sensor output shifts to ON. This makes it possible to determine whether recording media are loaded on the loading unit 21.

Next, a configuration of the feeding-separating unit will be described. As a result of the operation of the pressing plate 24 described above, the loaded recording media are pressed against the feeding roller 22. In response to being pressed by the recording media, the feeding roller 22 gets rotationally driven, so that the top recording medium among the recording media in contact with the feeding roller 22 is conveyed by friction on the feeding roller 22. Since the feeding roller 22 feeds recording media by means of friction, its material is preferably a rubber with a high coefficient of friction, such as EPDM, urethane foam, or the like.

Meanwhile, the friction between the feeding roller 22 and the top recording medium is usually greater than the friction between the top recording medium and the recording medium immediately under it, so that only the top recording medium is usually conveyed. However, the feeding roller 22 sometimes draws multiple recording media at once due to burrs formed at edges of the recording media when the recording media were cut, the recording media electrostatically sticking to each other, using recording media whose surfaces have an extremely high coefficient of friction, or the like.

In such a case, a separating roller 27 serving as a separating unit including a torque limiter is used to separate only the top recording medium. The separating roller 27 is pressed against the feeding roller 22 so as to abut on a portion thereof downstream in the conveyance direction of the point at which the feeding roller 22 and a recording medium come into contact with each other first.

Figure 5:
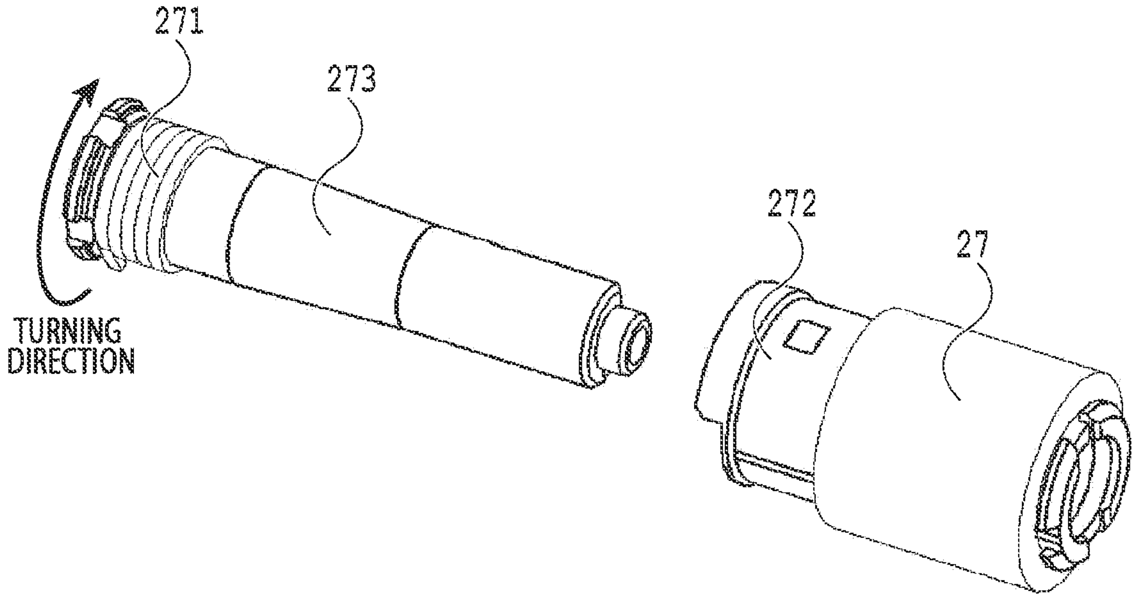
FIG. 5 is an exploded perspective view of a separating-roller unit.

Now, a configuration of the separating roller 27 will be described. FIG. 5 is an exploded perspective view of a separating-roller unit. The separating roller 27 is fixedly attached to a clutch tube 272, in which a clutch shaft 273 is rotatably contained. A clutch spring 271 is coiled around the clutch shaft 273, and one end of the coil of the clutch spring 271 is engaged with the clutch tube 272.

With the above configuration, the clutch spring 271 coiled around the clutch shaft 273 gets disengaged from the clutch shaft 273 in a case where the clutch shaft 273 is fixed and the separating roller 27 and the clutch tube 272 are turned in the direction of the arrow in FIG. 5. The configuration is such that the clutch shaft 273 and the clutch spring 271 slide relative to each other and thereby maintain a predetermined torque in a case where the separating roller 27 and the clutch tube 272 are turned by a predetermined angle.

The surface of the separating roller 27 is made of rubber, urethane foam, or the like to have a coefficient of friction substantially equal to that of the feeding roller 22. The separating roller 27 is rotatably supported on a separating-roller holder 274 serving as a separating-unit holding member via the clutch tube 272 and the clutch shaft 273, and is pressed against the feeding roller 22 by a separating-roller spring 275.

With this configuration, the separating roller 27 is driven by rotation of the feeding roller 22 to turn in a case where no recording medium is present between the feeding roller 22 and the separating roller 27.

In a case where one recording medium is present between the feeding roller 22 and the separating roller 27, the friction between the feeding roller 22 and the recording medium is greater than the friction between the separating roller 27, which is driven to turn with a predetermined torque, and the recording medium. Accordingly, the recording medium is conveyed while the separating roller 27 is driven to turn. In a case where two recording media are present between the feeding roller 22 and the separating roller 27, the friction between the feeding roller 22 and the recording medium on the feeding roller 22 side is greater than the friction between the recording media. Also, the friction between the separating roller 27 and the recording medium on the separating roller side is greater than the friction between the recording media. Accordingly, the recording media slide on each other. As a result, only the recording medium on the feeding roller 22 side is conveyed and, with the separating roller 27 not turned, the recording medium on the separating roller 27 side stays at the current position and is not fed.

Next, a configuration of a multi-feed preventing unit will be described. As described above, in a case where two recording media come into the nip between the feeding roller 22 and the separating roller 27, it is possible to separate the recording media. However, a problem may occur in a case where more than two recording media come in or in a case where two recording media come in, the recording medium on the feeding roller 22 side is fed, and then the next recording medium is successively fed with the other recording medium still remaining around the nip. Specifically, there is a possibility of so-called multi-feed, in which multiple recording media are fed at the same time. The multi-feed preventing unit is provided to prevent this multi-feed.

The multi-feed preventing unit has a returning lever 28. By moving the returning lever 28 into the conveyance path for recording media at the time of setting recording media or during a wait for recording, the leading edges of the recording media are prevented from accidentally deeply entering the feeding unit. The returning lever 28 is configured to be released and retract from the conveyance path for recording media after a feed operation is started, so that the returning lever 28 will not obstruct the travel of the recording medium being fed.

After the separating operation, the returning lever 28 starts an operation of returning the recording medium present at the nip (between the feeding roller 22 and the separating roller 27) by means of operation of a cam provided to a control gear 31. At this time, a front-stage restricting holder 29, which is a front-stage restricting member, and the separating-roller holder 274 including the separating roller 27 are also moved in a direction away from the feeding roller 22 by a releasing cam 32. The separating movements of the front-stage restricting holder 29 and the separating-roller holder 274 make it possible for the returning lever 28 to perform the recording medium returning operation with a small force.

The returning lever 28 is configured to pivot to such a position as to temporarily retract from the conveyance path for recording media after the recording medium returning operation, and return to the standby-state position again after the feed from the feeding unit 2 is completed.

Figure 6:
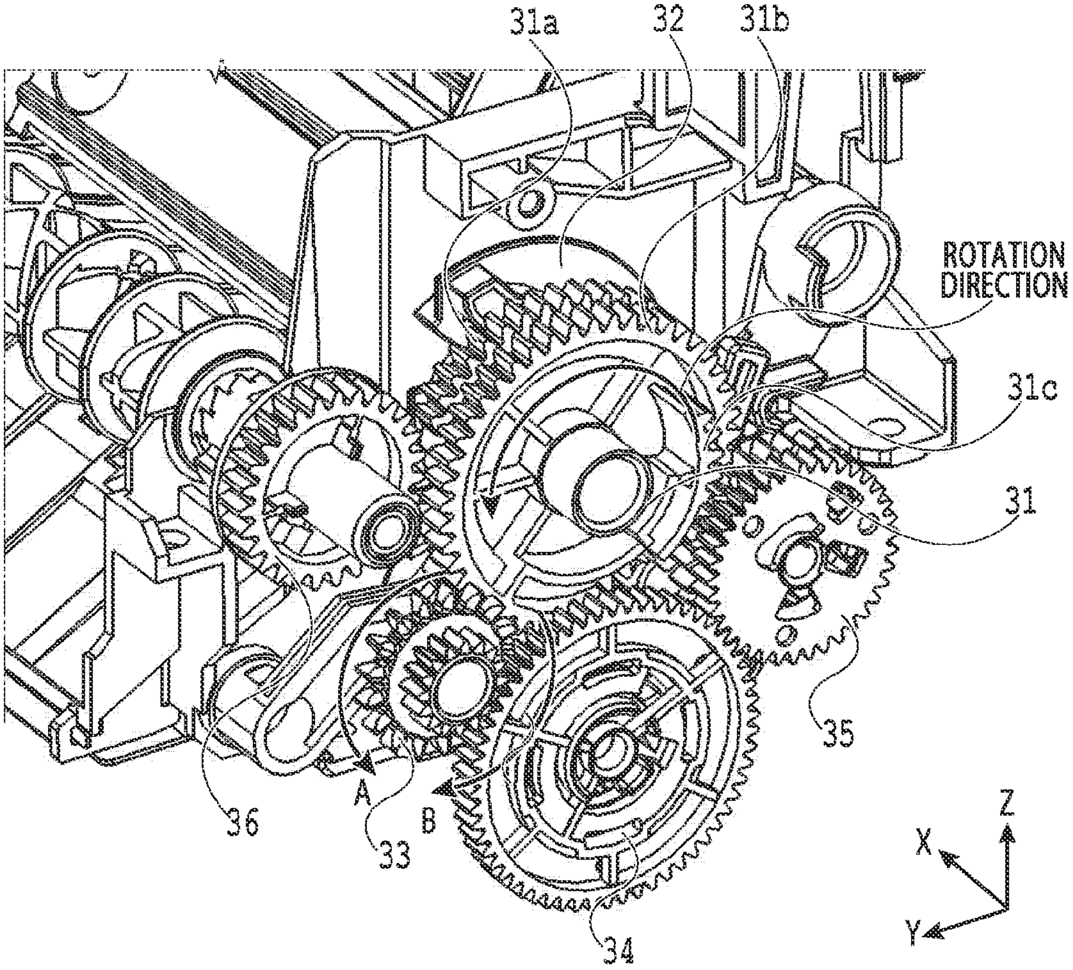
FIG. 6 is a perspective view of a driving unit provided to the feeding unit.

Next, a configuration of the driving unit will be described using FIG. 6. FIG. 6 is a perspective view of the driving unit. The driving unit includes an input gear 33, intermediate gears 34 and 35, the control gear 31, the releasing cam 32, and a roller gear 36. The control gear 31 turns together with the releasing cam 32, and turns from a standby position, which is its initial position, to a sheet passage position by turning in the turning direction indicated by the arrow thereon. As the control gear 31 turns from the standby position to the sheet passage position, the releasing cam 32 pushes down or releases a follower (not illustrated), thereby causing the follower to pivot. As a result, the raising and lowering operations of the pressing plate 24 and the retracting and returning operations of the returning lever 28 described above are performed. As a driving force is transmitted from the control gear 31 to the roller gear 36, the feeding roller 22 performs a rotating operation. The control gear 31 further turns from the sheet passage position in the rotation direction of the arrow to turn to the standby position. While the control gear 31 turns from the sheet passage position to the standby position, no driving force is transmitted from the control gear 31 to the roller gear 36 since a missing-tooth gear 31*a* disengages these gears from each other. Also, the returning lever 28 is moved from the returning position to the standby position described above. Thus, while the control gear 31 rotates once in the direction of the arrow in FIG. 6, the feeding unit 2 performs a series of feed operations once.

The feeding unit 2 is coupled to the driving motor 6 by a gear train (not illustrated), and is driven by rotating the control gear 31 through the intermediate gears 34 and 35 with a driving force input by the input gear 33. The intermediate gears 34 and 35 are each two steps of gears having a latch mechanism therein. The two steps of gears can operate in a coupled state in a case of rotating in one direction, whereas they are not coupled to each other in a case of rotating in the opposite direction, so that the gear on the output side slips relative to the gear on the input side.

The control gear 31 is formed of multiple steps of missing-tooth gears. In a case where the input gear 33 is driven in the arrow-A direction in FIG. 6, the driving force is transmitted to a missing-tooth gear 31*b* of the control gear 31 through the intermediate gear 34, so that the control gear 31 turns in the direction of the arrow thereon in FIG. 6. The missing-tooth gear 31*b* of the control gear 31 is provided for the turning range from the standby position to the sheet passage position mentioned above. Thus, in response to a driving force in the A direction from the input gear 33, the control gear 31 turns from the standby position to the sheet passage position. After reaching the sheet passage position, the missing-tooth gear 31*b* of the control gear 31 is disengaged, thereby eliminating the driving connection between the intermediate gear 34 and the control gear 31. Accordingly, the control gear 31 does not turn any further. At this time, the intermediate gear 35 does not transmit the driving force to the gear on the output side by means of the latch mechanism mentioned above. Hence, the driving force is not transmitted to a missing-tooth gear 31*c* of the control gear 31.

In a case where the input gear 33 is driven in the arrow-B direction in FIG. 6, the driving force is transmitted to the missing-tooth gear 31*c* of the control gear 31 through the intermediate gears 34 and 35, so that the control gear 31 turns in the direction of the arrow thereon in FIG. 6. The missing-tooth gear 31*c* of the control gear 31 is provided for the turning range from the sheet passage position to the standby position mentioned above. Thus, in response to a rotational driving force in the B direction from the input gear 33, the control gear 31 turns from the sheet passage position to the standby position. After reaching the standby position, the missing-tooth gear 31*c* is disengaged, thereby eliminating the driving connection between the intermediate gear 35 and the control gear 31. Accordingly, the control gear 31 does not turn any further. The intermediate gear 34 does not transmit the driving force to the gear on the output side by means of the latch mechanism mentioned above. Hence, the driving force is not transmitted to the missing-tooth gear 31*b* of the control gear 31.

As described above, as the input gear 33 turns in the A direction, the driving unit of the feeding unit performs a series of feed operations from the standby position to the sheet passage position. Thereafter, the input gear 33 turns in the B direction, so that the driving unit performs a feed preparation operation from the sheet passage position to the standby position. L1 is defined as the distance by which the conveying roller 51 conveys a recording medium toward the upstream side in the conveyance direction in response to driving the input gear 33 by a rotation amount in the B direction necessary for the feed preparation operation.

<Configurations of Conveying Unit and Conveyance Path>

Figure 7:
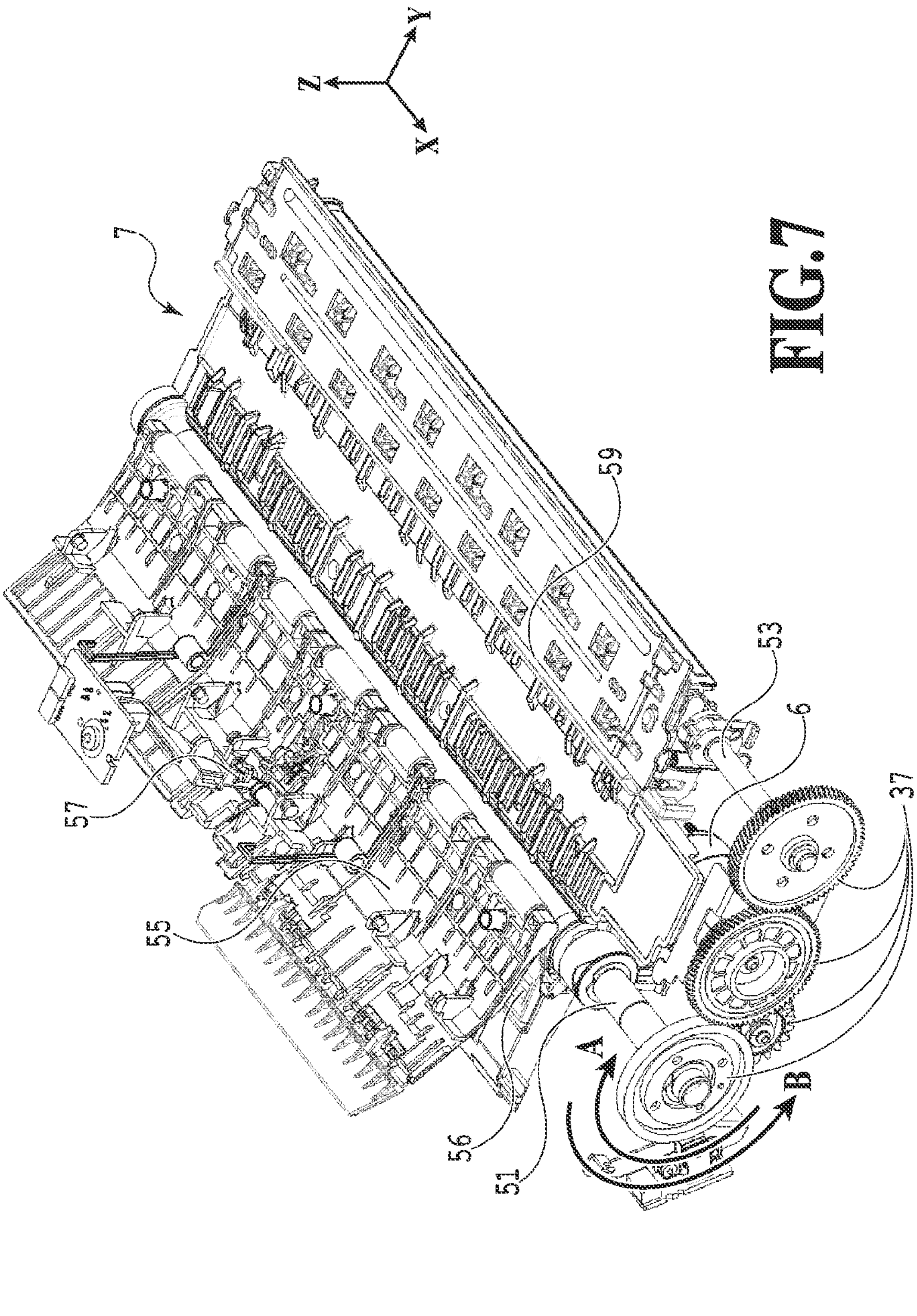
FIG. 7 is a perspective view of a conveying unit.
Figure 8:
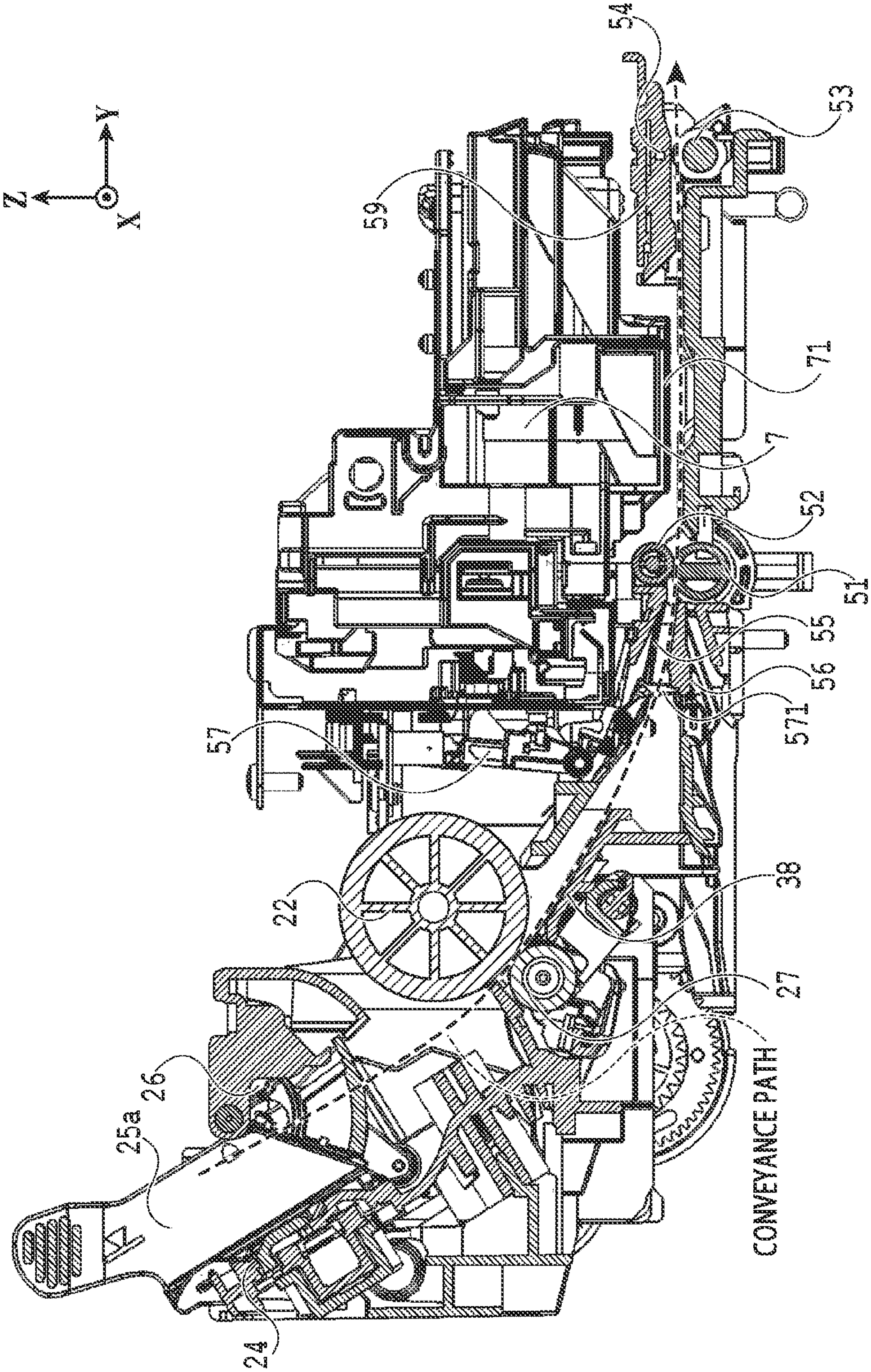
FIG. 8 is a cross-sectional view of the conveying unit illustrating a conveyance path.

FIG. 7 is a perspective view of the conveying unit. FIG. 8 is a cross-sectional view of the conveying unit in the width direction illustrating the conveyance path from the feeding unit to the discharging unit.

The conveying roller 51 and the discharging roller 53 are coupled by the driving motor 6 and a gear train 37. In a case where the driving motor 6 rotates the conveying roller 51 in the arrow-A direction in FIG. 7, the conveying roller 51 and the discharging roller 53 each rotate in a direction for conveying a recording medium toward the downstream side in the conveyance direction (i.e., forward direction). In a case where the driving motor 6 rotates the conveying roller 51 in the arrow-B direction in FIG. 7, the conveying roller 51 and the discharging roller 53 each rotate in such a direction for conveying a recording medium toward the upstream side in the conveyance direction. The conveying roller 51 is coupled to the input gear 33 of the feeding unit 2 by a gear train (not illustrated). In the case where the conveying roller 51 rotates the arrow-A direction, the input gear 33 of the feeding unit 2 described above rotates in the arrow-A direction, i.e., in a direction for performing a feed operation. In the case where the conveying roller 51 rotates in the arrow-B direction, the input gear of the feeding unit 2 described above rotates in the B direction, i.e., in a direction for performing a feed preparation operation. The driving amount of the driving motor 6 is detected by an encoder (not illustrated), and various types of control, such as proportional-integral-derivative (PID) control, are performed. In this way, the speed and driving amount of the driving motor 6 are controlled.

A recording medium fed by the feeding unit 2 passes through a conveyance path as indicated by the dotted arrow in FIG. 8. First, guided by the pinching-roller holder 55 and the guiding unit 56, the recording medium is fed to the conveying roller 51. An edge detecting lever 57 is attached to the pinching-roller holder 55. When a recording medium passes through the conveyance path, the edge detecting lever 57 is pivoted to detect the position of the leading edge or the trailing edge of the recording medium. The position of the leading edge of the recording medium is detected in a teed operation, and a recording operation is performed based on the result of the detection. Also, by detecting the position of the trailing edge in a discharging operation, it is possible to derive the length of the recording medium based on the driving amount of the driving motor 6 taken from the detection of the position of the leading edge to the detection of the position of the trailing edge. In this case, there can be an error of L2 at maximum between the derived sheet length and the actual sheet length due to variation in a spring force biasing the edge detecting lever and the like.

A tip portion 571 of the edge detecting lever 57 is pivotally attached. Thus, in a case of conveying a recording medium toward the upstream side in the conveyance direction from the conveying roller 51, the tip portion 571 pivots and retracts away from the recording medium. This enables a conveyance operation without damaging the recording medium.

The recording medium fed to the conveying roller 51 is subjected to a skew correction operation and the like and then conveyed to the recording unit 7. A recording head 71 attached inside the recording unit 7 executes main scanning in which it reciprocally moves in a direction orthogonal to the conveyance direction of the recording medium. As a result, recording is performed on the recording medium. The recording medium conveyed from the conveying roller 51 is guided by the platen 58 and a spur-roller base 59 and then reaches the discharging roller 53. During the recording operation on the recording medium, the conveyance operation is performed by, the conveying roller 51 or the discharging roller 53 or both. After the completion of the recording operation, the recording medium is discharged onto the discharge tray 81 by the discharging roller 53.

In a case of performing a feed-discharge operation to be described later, it is necessary to perform a feed preparation operation after completing a feed operation in order to perform successive feed operations. For this reason, the conveying roller 51 is rotated in the arrow-B direction. In this way, the conveying roller 51 and the discharging roller 53 convey the recording medium toward the upstream side in the conveyance direction.

<Backward Rotation-Permitted Regions and Backward Rotation-Prohibited Regions>

Figure 9:
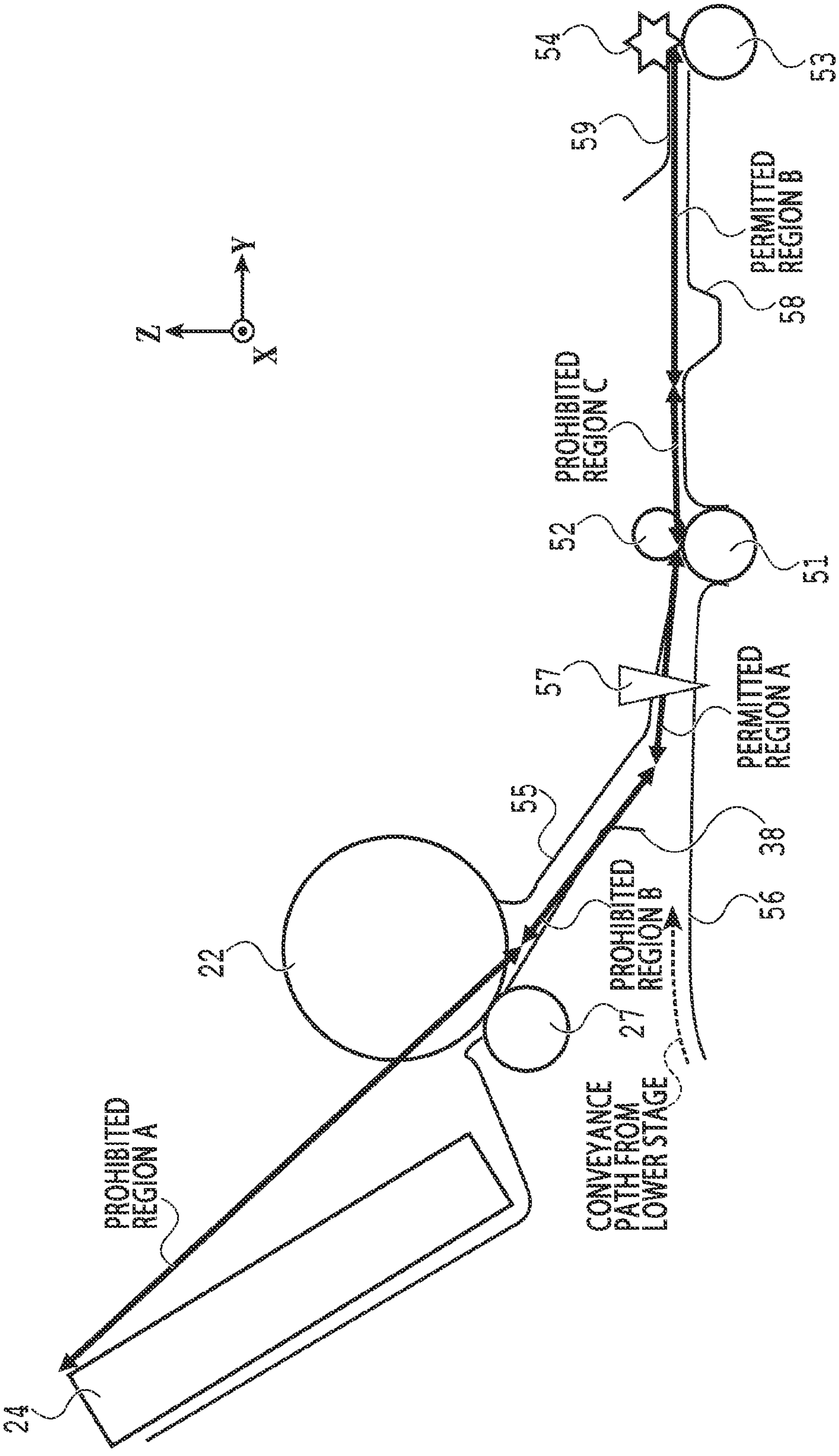
FIG. 9 is a schematic diagram illustrating the conveyance path.
Figure 10:
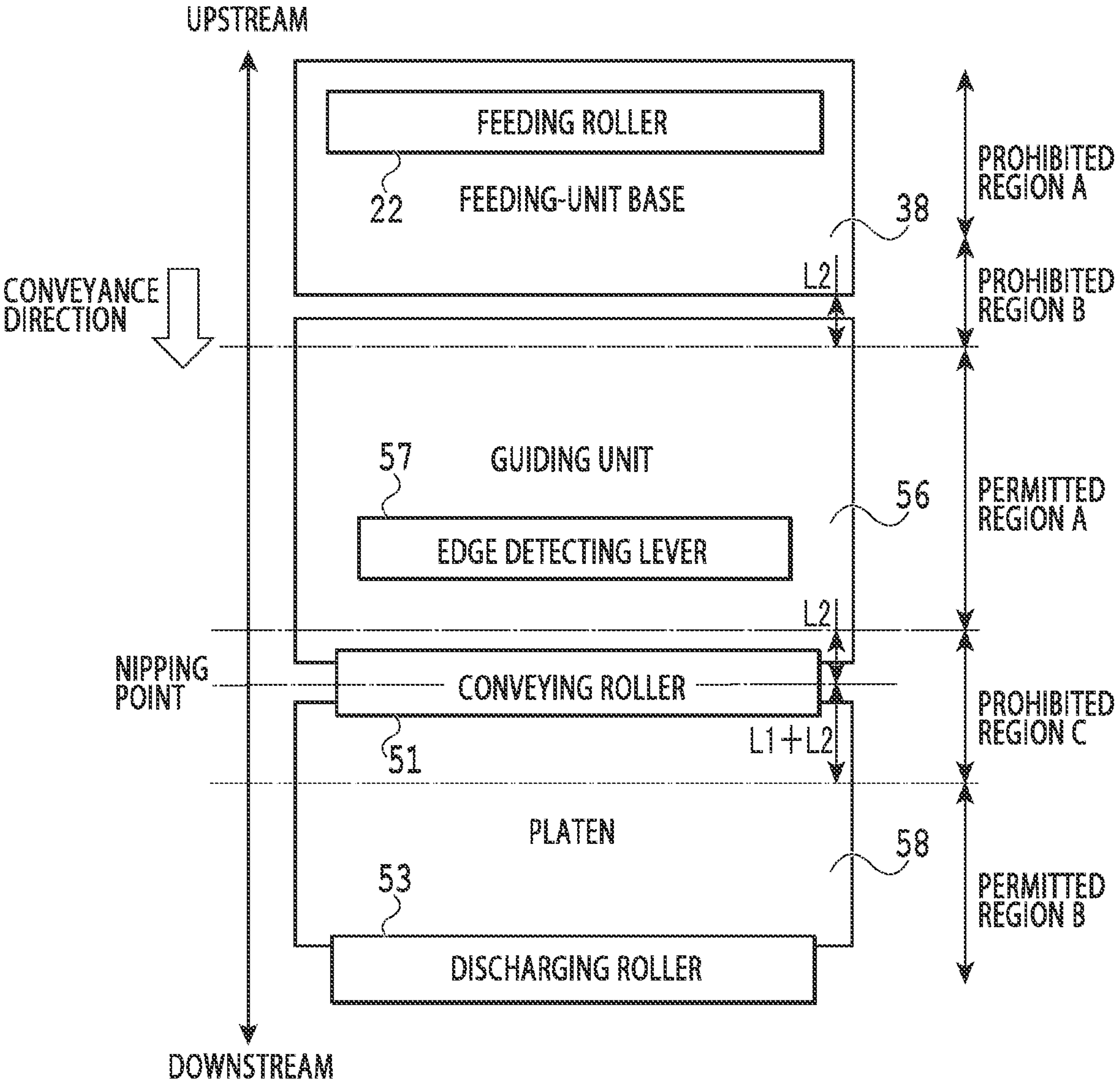
FIG. 10 is a schematic diagram illustrating permitted regions and prohibited regions in the conveyance path.

FIG. 9 is a schematic diagram of the conveyance path as seen from the X direction. FIG. 9 illustrates regions in each of which the conveying roller 51 is permitted to be driven to rotate backward (i.e., a recording medium is permitted to move backward) (hereinafter referred to as "permitted region") in a case where the recording medium is still in the conveyance path, that is, in a case where the trailing edge of the recording medium is situated within the region. FIG. 9 also illustrates regions in each of which the conveying roller 51 is not permitted to be driven to rotate backward (i.e., a recording medium is not permitted to move backward) (hereinafter referred to as "prohibited region") in a case where the trailing edge of the recording medium is situated within the region). FIG. 10 is a diagram schematically illustrating each roller, the guiding unit under the conveyance path, the permitted regions (two), and the prohibited regions (three). Note that L1 denotes the moving distance by which the conveying roller 51 conveys a recording medium toward the upstream side in the conveyance direction in a case of performing a feed preparation operation. Also, L2 denotes the maximum value of the error between the length of the recording medium detected by the edge detecting lever 57 and the actual length of the recording medium.

The permitted regions are set at two positions which are around the edge detecting lever 57 and on the platen 58. A first permitted region (permitted region A) is a region situated around the edge detecting lever 57 where the pinching-roller holder 55 guides the upper side in the conveyance direction (+Z side) and the guiding unit 56 guides the lower side in the conveyance direction (−Z side). The pinching-roller holder 55 is formed as a single member and therefore does not have a joint portion that would otherwise be present in a case where the conveyance path part is formed of multiple members. This eliminates the possibility of the trailing edge of a recording medium getting caught on a step in a case where the recording medium is moved backward. The guiding unit 56 is two members assembled together, but the joints of the two members are joined in a pectinate shape. This eliminates the possibility of an edge of a recording medium being caught on the joints in a case where the edge comes from the upstream side in the conveyance direction and also in a case where the edge comes from the downstream side in the conveyance direction. Moreover, since the tip of the edge detecting lever 57 mentioned earlier pivots, a recording medium can be conveyed from the downstream side in the conveyance direction.

A second permitted region (permitted region B) is situated on the platen. As with the first permitted region (permitted region A), the platen, which guides the lower side in the conveyance direction, is firmed of a single member, so that the second permitted region (permitted region B) is a region without the possibility of a recording medium vetting caught on a step in a case of being conveyed from the downstream side in the conveyance direction.

The prohibited regions are set at three positions which are: from an upstream side of the feeding roller 22 to a downstream side of the feeding roller 22; from the feeding unit 2 to the position where a recording medium is passed to the guiding unit 56; and around the conveying roller 51.

A first prohibited region (prohibited region A) is a region situated around the feeding roller and extending from an upstream side of the feeding roller 22 to a downstream side of the feeding roller 22. The feeding roller 22 can rotate only in one direction for conveying a recording medium toward the downstream side in the conveyance direction (the feeding roller 22 can rotate only in the forward direction). Accordingly, a recording medium cannot move backward toward the upstream side from the feeding roller 22 in a state where the recording medium is nipped by the feeding roller 22 or the trailing edge of the recording medium has moved backward and is nipped by the feeding roller 22 again. Thus, rotating the conveying roller 51 in the backward direction in such a state may cause a paper jam or damage the recording medium.

A second prohibited region (prohibited region B) is from the feeding unit 2 to the position where a recording medium is passed to the guiding unit 56. Specifically, the prohibited region B ends at a position downstream of the downstream end of a feeding-unit base 38 in the conveyance direction by L2 in the conveyance direction. The recording medium is passed from the feeding-unit base 38 to the guiding unit 56 on the downstream side of the conveyance path included in the prohibited region B. There is a region where whether the trailing edge of the recording medium is on the feeding-unit base 38 or on the guiding unit 56 is unstable depending on the error in the length of the recording medium detected by the edge detecting lever 57. Thus, the trailing edge of the recording medium may get caught on the feeding-unit base 38, causing a paper jam, in a case where the recording medium is moved backward in the middle of passing the trailing edge of the recording medium from the feeding-unit base 38 to the guiding unit 56. Incidentally, the maximum value of the error in the length of the recording medium detected by the edge detecting lever 57 is L2. Hence, as long as the trailing edge of the recording medium is downstream of a position determined by a control unit to be separated from the downstream end of the feeding-unit base 38 in the conveyance direction by L2 or more toward the downstream side in the conveyance direction, it is possible to perform a feed preparation operation with the actual trailing edge of the recording medium certainly passed to the guiding unit 56. In this case, there is no possibility of the recording medium getting caught on the feeding-unit base 38.

In the present embodiment, a gap is provided between the feeding-unit base 38 and the guiding unit 56 to provide a conveyance path for sheet feed from a lower stage, and a step is formed due to that gap. Accordingly, this region is designated as a prohibited region. Even in a case where the region between the feeding-unit base 38 and the guiding unit 56 is a region with multiple guide members including joints, the region does not necessarily have to be designated as a prohibited region as long as the guide members can be joined in such a shape as to prevent the trailing edge of a recording medium from being caught in the backward direction, such as a pectinate shape.

A third prohibited region (prohibited region C) is a portion around the conveying roller 51. Specifically, the prohibited region C is defined as a region from the position upstream of the nipping point between the conveying roller 51 and the pinching rollers 52 by L2 in the conveyance direction to the position downstream of this nipping point by L1+L2 in the conveyance direction. Usually, for the conveyance of a recording medium through the conveyance path in automatic duplex printing or the like, a configuration is often employed in which the recording medium having been conveyed downstream from the conveying roller 51 is conveyed backward toward the conveying roller 51 to be nipped and conveyed by it again. In such a case, it is common practice to, for example, lower the conveyance speed at the time of the re nipping and/or provide a wait time before the re-nipping to reform the recording medium to prevent the recording medium from getting caught on the conveying roller 51 and causing a paper jam at the time of the re-nipping. Here, in a case of performing a feed-discharge operation, one may consider lowering the conveyance speed and/or providing a wait time to successfully nip a recording medium again. In this case, although shortening the time required for recording is an important object, this required time may actually increase. For this reason, in the present embodiment, a location around the conveying roller 51 is designated as a prohibited region. In some embodiments, the location around (downstream of) the conveying roller 51 may be designated as a permitted region. Examples of such embodiments include one in which a paper jam is unlikely to occur even in a case where the conveyance speed is a normal speed at the time of the re-nipping by the conveying roller 51, one in which the required time is shorter in a case of lowering the conveyance speed to prevent a paper jam than in a case of performing a feed preparation operation after conveying the trailing edge of the recording medium to the next permitted region on the downstream side, and the like.

There is a region where whether the trailing edge of the recording medium has exited the nip of the conveying roller 51 is unstable depending on the error in the length of the recording medium detected by the edge detecting lever 57. Specifically, it is a region extending upstream from the nipping point of the conveying roller 51 serving as a reference point (origin) by L2 in the conveyance direction and downstream from the nipping point by L2 in the conveyance direction. In a case where the region extends upstream from the conveying roller 51 by less than L2 in the conveyance direction, the actual trailing edge of the recording medium may be situated downstream of the conveying roller 51 and get nipped again in a feed preparation operation depending on the detection error of the edge detecting lever 57. Also, in the feed preparation operation, the recording medium is conveyed upstream by a distance of L1 in the conveyance direction. Thus, in a case where the region extends downstream from the conveying roller 51 by less than L1+L2 in the conveyance direction, the recording medium may get nipped by the conveying roller 51 again in the feed preparation operation. For this reason, the region from the position upstream of the conveying roller 51 by L2 in the conveyance direction to the position downstream of the conveying roller 51 by L1+L2 in the conveyance direction is designated as a prohibited region.

In the present embodiment, locations around rollers and a location around a joint of guide members have been presented as examples of the prohibited regions, but the prohibited regions are not limited to these locations. Any locations may be designated as prohibited regions as long as the locations are where a recording medium may get caught or a paper jam may occur.

As described above, the entire conveyance path can be divided into permitted regions and prohibited regions. Moreover, the most downstream region in the conveyance path is set as a permitted region.

<Control Unit>

Figure 11:
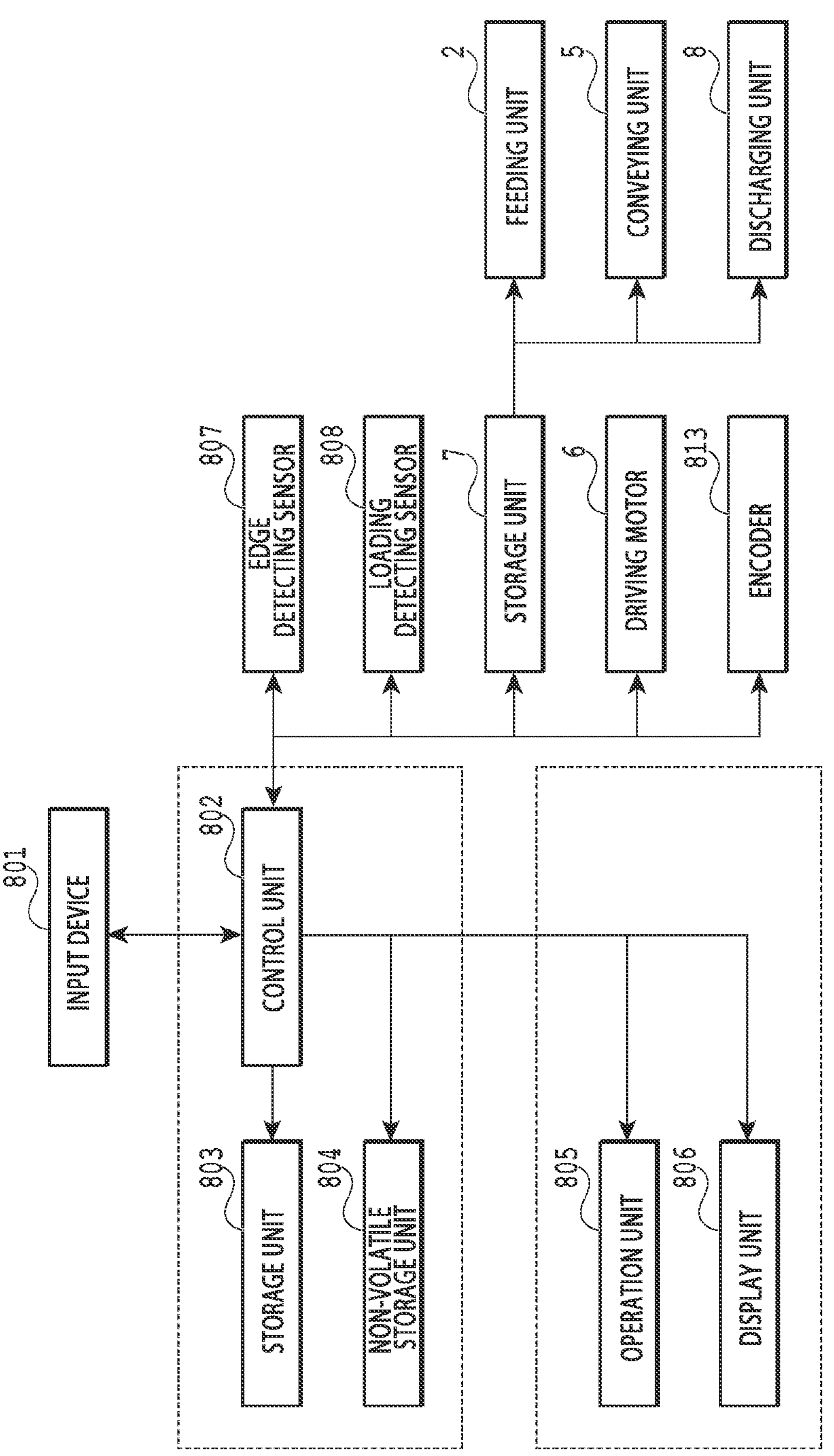
FIG. 11 is a block diagram illustrating a control configuration of the recording apparatus.
Figure 12:
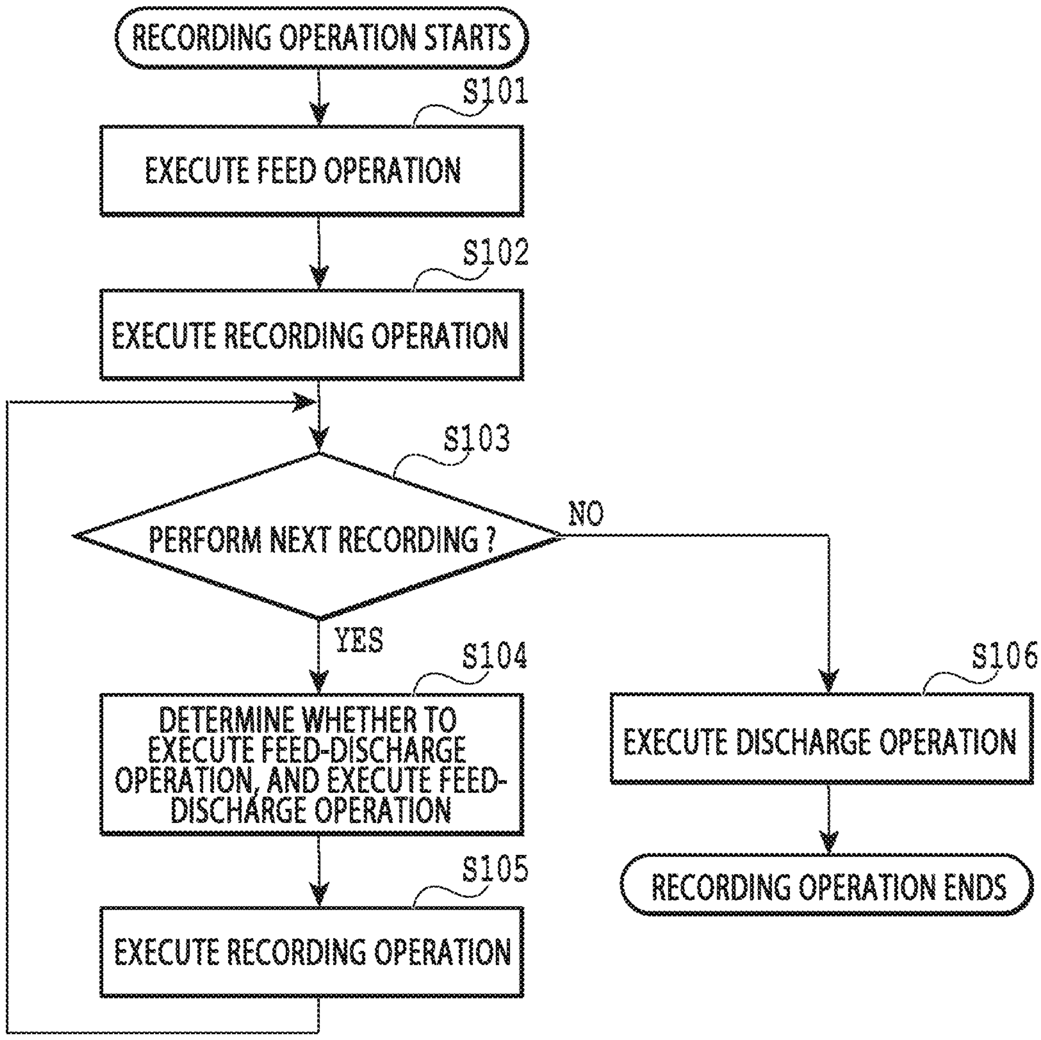
FIG. 12 is a flowchart of a recording operation.

FIG. 11 is a block diagram illustrating a control configuration of the recording apparatus. FIG. 12 is a flowchart illustrating a recording operation by the recording apparatus. A flow of a recording operation will be described using these.

First, the user requests printing, copying, or the like by using an input device 801 of a personal computer (PC), a smartphone, or the like or via an operation unit 805 provided to the recording apparatus. A control unit 802 includes a central processing unit (CPU) and the like. In response to receiving the request, the control unit 802 stores information on a print job associated with the request and information on the size of the recording medium to be subjected to the recording in a storage unit 803. The control unit 802 performs control while reading out information on the position of the driving motor 6 with an encoder 813. The driving motor 6 is capable of transmitting a driving force to the feeding unit 2, the conveying unit 5, and the discharging unit 8 coupled thereto, and these units are driven together. An edge detecting sensor 807 and the loading detecting sensor 808 obtain information indicating states of recording media loaded and conveyed.

In response to receiving an instruction to perform a recording operation from the user, the recording apparatus starts the recording operation in FIG. 12. The process of each step in FIG. 12 is executed by the CPU of the control unit 802 unless otherwise noted.

In step S101, the CPU performs a feed operation by driving the feeding unit 2 with a driving force generated by the driving motor 6. As a result of this feed operation, a recording medium loaded on the loading unit is fed to the conveying unit. In the following, "step S_" will be abbreviated as "S_".

In S102, the CPU performs a recording operation with the recording unit 7 on the recording medium conveyed to the recording unit 7 by the conveying unit 5.

After finishing the recording operation in S102, the CPU determines in S103 whether the recording apparatus is to successively perform next recording. If the result of the determination in this step is positive, the CPU proceeds to S104. If the result of the determination in this step is negative, the CPU proceeds to S106.

If the recording apparatus is to perform next recording (YES in S103), then in S104, the CPU performs determination of whether to execute a feed-discharge operation and performs a feed-discharge operation to be described later.

In S105, the CPU performs a recording operation with the recording unit 7 on the recording medium fed and conveyed. After S105, the CPU returns to S103 and determines again whether the recording apparatus is to successively perform next recording.

If determining that the recording apparatus is not to perform next recording, that is, the last recording operation is the final recording operation (NO in S103), the CPU performs a discharge operation in S106.

After finishing the discharge operation in S106, the CPU terminates the series of operations.

In a case where the edge detecting sensor 807, the loading detecting sensor 808, or the encoder 813 detects abnormality in the flow of FIG. 12, an error process is executed. Specifically, guidance is given to the user by, for example, presenting an appropriate error display, such as displaying a paper jam error or a paper out error on a display unit 806, and displaying an instruction on how to handle the error on the display unit 806.

<Execution of Feed-Discharge Operation Including Determination of Whether to Execute Feed-Discharge Operation>

Figure 13B:
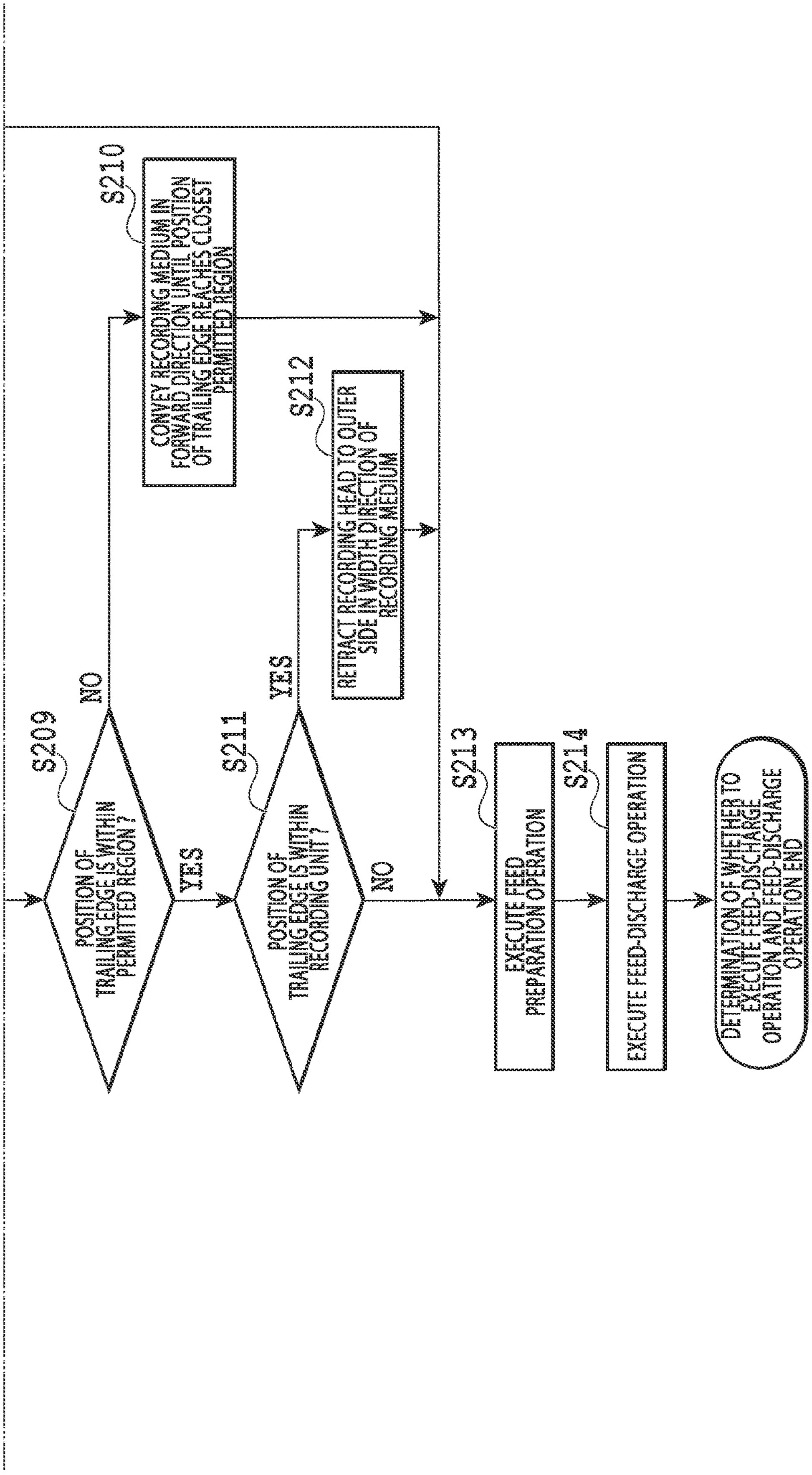

The execution of a feed-discharge operation including determination of whether to execute a feed-discharge operation will be described below using FIGS. 13A and 13B. FIGS. 13A and 13B are flowcharts illustrating a flow of a feed-discharge operation. A "feed-discharge operation" in the present embodiment means an operation performed in a case of performing recording on multiple recording media to feed a next recording medium (subsequent recording medium) with a recorded recording medium (preceding recording medium) still remaining in the conveyance path, and control for performing this operation. The process of each step in FIGS. 13A and 13B is executed by the CPU of the control unit 802 unless otherwise noted.

First, in a case of successively performing recording operations, in S201, the CPU determines whether conditions for executing a feed-discharge operation are met. Performing recording on multiple recording media does not always involve a feed-discharge operation, and a teed-discharge operation may not be performed depending on settings such as the sizes and types of the recording media and the recording speed. The determination process in this step is performed for this reason. If the result of the determination in this step is positive, the CPU proceeds to S203. If the result of the determination in this step is negative, the CPU proceeds to S202.

In S202, the CPU performs a discharge operation of discharging a recorded recording medium onto the discharging unit 8. This step is followed by a feed preparation operation for the next recording medium (S213) and a feed-discharge operation (S214).

In S203, the CPU determines whether the recording medium being recorded in the current recording operation is the first recording median. If the result of the determination in this step is positive, the CPU proceeds to S204. If the result of the determination in this step is negative, the CPU proceeds to S206.

If the recording medium being recorded is the first recording medium (YES in S203), then in S204, the CPU does not perform a feed-discharge operation and performs only a discharge operation. As will be specifically described later, the reason for performing only a discharge operation in this step is to measure the length of the loaded recording medium.

In S205, the CPU measures the length of the recording medium that has completed being recorded (first recording medium), and stores information of the measured length in the storage unit 803. The length information of the recording medium stored in the storage unit 803 may be deleted after the completion of the recording operation, or stored in a non-volatile storage unit 804 and utilized in a feed-discharge operation in the next or subsequent recording operation.

In a case where the recording medium to be recorded is the second or subsequent one, a feed-discharge operation will be performed as the subsequent operation. While the conveying roller 51 needs to be rotationally driven in the backward direction to perform a feed preparation operation, the position of the trailing edge of the recording medium at the time of completing the recording varies by the pattern recorded and the size of the recording medium. It is therefore necessary to derive the position of the trailing edge of the recorded recording medium, and determine whether the derived position of the trailing edge is such a position that the recording medium can be conveyed toward the upstream side in the conveyance direction.

In S206, the CPU determines whether the hailing edge of the recorded recording medium has been detected by the edge detecting lever 57. If the result of the determination in this step is positive, the CPU proceeds to S207. If the result of the determination in this step is negative, the CPU proceeds to S208.

In S207, the CPU calculates the position of the trailing edge of the recorded recording medium based on the position of the trailing edge of the recording medium detected in S206 and the driving amount of the driving motor 6 after the detection of the trailing edge until the completion of the recording. Incidentally, "the position of the trailing edge of the recording medium detected in S206" mentioned above means the position of the edge detecting lever 57 in the conveyance direction and is expressed with a constant reference value. Also, "the position of the trailing edge of the recorded recording medium" means a non-constant value based on the driving amount of the driving motor 6. The position of the trailing edge of the recorded recording medium can be calculated by adding the driving amount of the driving motor 6 to the position of the edge detecting lever 57 in the conveyance direction.

In S208, using the length information stored in the storage unit 803, the CPU calculates the position of the trailing edge of the recorded recording medium based on the length of the first recording medium and the driving amount of the driving motor 6 after the feed of the recorded recording medium until the completion of the recording.

In S209, the CPU determines whether the position of the trailing edge calculated in S207 or S208 is within a permitted region. If the result of the determination in this step is positive, the CPU proceeds to S211. If the result of the determination in this step is negative, the CPU proceeds to S210.

In a case where the calculated position of the trailing edge is not within a permitted region (NO in S209), that is, the calculated position of the trailing edge is within a prohibited region, immediately executing a feed preparation operation, that is, immediately rotationally driving the conveying roller 51 in the backward direction leads to a possibility of an edge of the recording medium getting caught, a paper jam, or the like. Thus, in S210, the CPU conveys the recording medium toward the downstream side in the conveyance direction by rotationally driving the conveying roller 51 in the forward direction until the position of the trailing edge of the recording medium reaches the closest permitted region on the downstream side in the conveyance direction. In the present embodiment, the most downstream region in the conveyance path in the conveyance direction is set as a permitted region. Hence, a permitted region is always present downstream of each prohibited region in the conveyance direction. Thus, executing a feed preparation operation after S210 can prevent a paper jam.

Even in the case where the calculated position of the trailing edge is within a permitted region, the recording head 71 may be situated above the recording medium immediately after the completion of the recording if the trailing edge of the recording medium is situated within the recording unit 7. In this case, executing a feed preparation operation, that is, rotationally driving the conveying roller 51 in the backward direction may bring the recording medium into contact with the recording head 71. This may cause a paper jam or ink soiling. For this reason, in S211, the CPU determines whether the trailing edge of the recording medium is situated within the recording unit 7. If the result of the determination in this step is positive, the CPU proceeds to S212. If the result of the determination in this step is negative, the CPU proceeds to S213.

In S212, the CPU moves the recording head 71 in the width direction of the recording medium to retract the recording head 71 to an outer side in the width direction of the recording medium. By retracting the recording head 71, it is possible to prevent a paper jam or the like due to the recording medium contacting the recording head 71 in the subsequent feed preparation operation (S213).

In S213, the CPU executes the feed preparation operation.

In a case where the calculated position of the trailing edge is within a permitted region and the trailing edge of the recording medium is not situated within the recording unit 7, a feed preparation operation can be performed immediately. Even in a case where the calculated position of the trailing edge is within a permitted region and the trailing edge of the recording medium is situated within the recording unit 7, a feed preparation operation can be performed immediately as long as the recording head has already retracted to the outer side in the width direction of the recording medium.

As a result of the series of processes of S201 to S212 described above, the CPU determines that a paper jam is not likely to occur even if the recording medium is conveyed toward the upstream side in the conveyance direction. Thus, in S213, the CPU performs a feed preparation operation to thereby rotate the conveying roller in the backward direction.

In S214 after S213, the CPU executes a feed-discharge operation by switching the conveyance direction of the recording medium from the direction toward the upstream side in the conveyance direction to the direction toward the downstream side in the conveyance direction. By this step, the preceding recording medium that has completed being recorded is discharged and the subsequent recording medium to be recorded next is fed simultaneously.

As described above, the position of the trailing edge of a recorded recording medium is derived, and a feed preparation operation is performed on condition that the trailing edge is present at such a position that a paper jam is not likely to occur. In this way, it is possible to execute a feed-discharge operation under a wider range of conditions and thus to achieve both shortening of the time required for a recording operation and prevention of a paper jam.

In a feed-discharge operation, operation control is performed based on the position of the trailing edge of the recorded recording medium, in recording, recording data set on a PC or the like and sent from the PC or the like may be used to estimate the length of a recording medium and derive the position of its trailing edge. Note that the recording medium size in the set recording data and the size of the recording media actually loaded on the recording apparatus may differ. Thus, in the present embodiment, it is assumed that the recording media loaded on the loading unit are recording media of a common identical size. Under this assumption, in a recording operation of the first recording medium, the length of the recording medium actually conveyed is measured, and a feed-discharge operation is performed in a recording operation of the second and subsequent recording media based on the data of the measured length. Nonetheless, the conditions used in a case of performing a feed-discharge operation are not limited to the conditions in the present embodiment. For example, each recording operation may involve detecting the position of the trailing edge of the recording medium with an edge detecting sensor or the like and using the detected position of the trailing edge, or utilize recording medium length information contained in recording data set on a PC or the like.

<Movement of Recording Medium in Feed-Discharge Operation>

Figure 14:
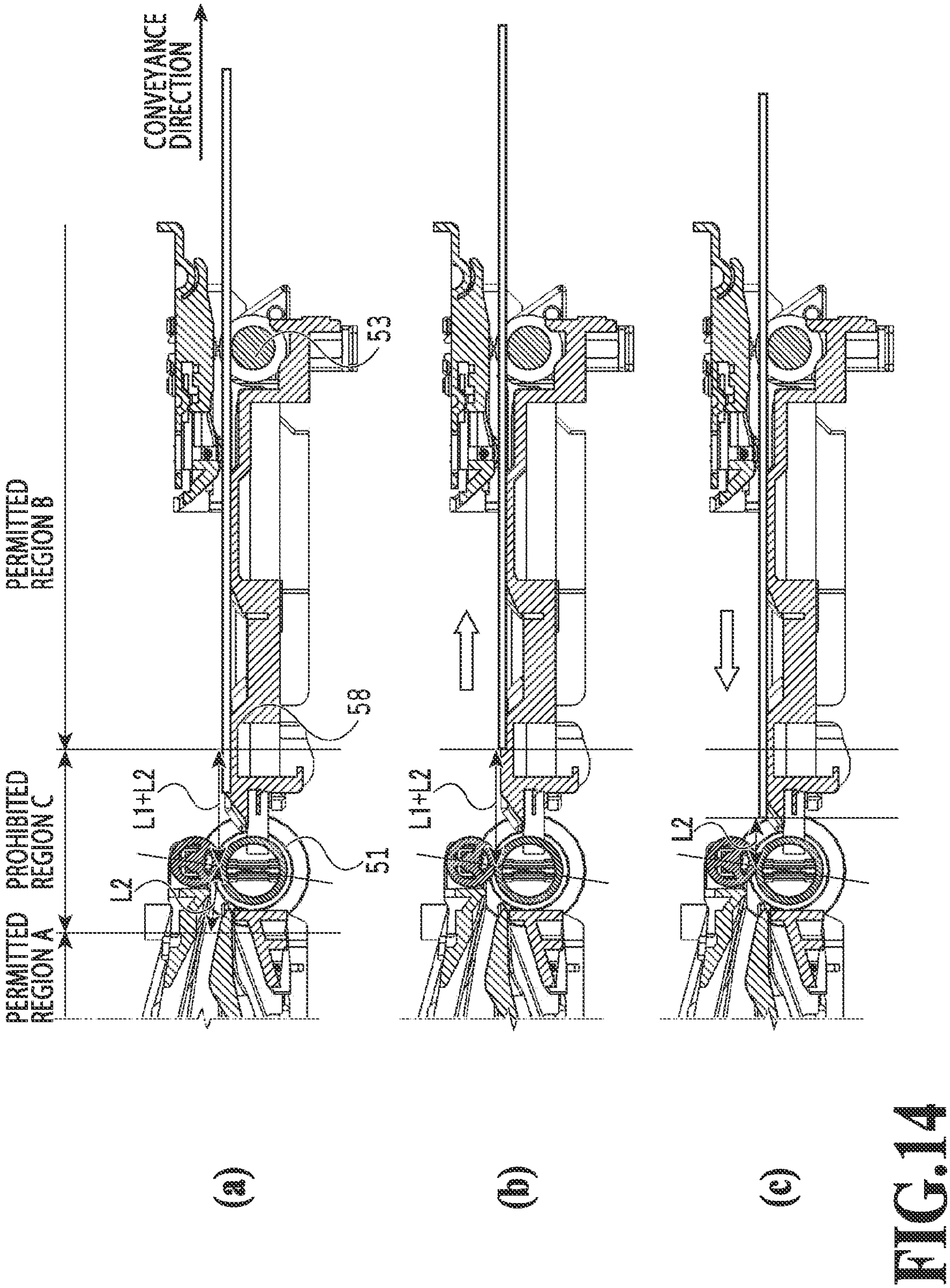
FIG. 14 is an explanatory view of a feed-discharge operation in a case where recording is completed at a prohibited region.

The movement of a recording medium in a feed-discharge operation will be described below using diagrams. FIG. 14 shows cross-sectional views of the conveying unit and its periphery illustrating the movement of a recording medium after a recording operation ended with the trailing edge of the recording medium situated within the prohibited region C.

Part (a) of FIG. 14 illustrates a state immediately after the end of the recording operation where the trailing edge of the recording medium is situated at a position separated from the conveying roller 51 by less than L1+L2 toward the downstream side. In a case where a feed preparation operation is executed in the above state, specifically, the conveying roller 51 and the discharging roller 53 are each rotated in the backward direction in the above state, the trailing edge of the recording medium is conveyed by L1 toward the upstream side in the conveyance direction. As mentioned above, the maximum value of the error in the length of a recording medium detected by the edge detecting lever 57 is L2. Hence, even in a case where the control unit (CPU) determines that the position of the trailing edge of the recording medium is separated from the conveying roller 51 by L1 or more, the actual position may be less than L1 away from the conveying roller 51.

For this reason, as illustrated in Part (b) of FIG. 14, the recording medium is conveyed in the conveyance direction to such a position that the trailing edge of the recording medium will not be nipped by the conveying roller 51 again even if the trailing edge is moved toward the upstream side by L1 in the conveyance direction (the position separated from the conveying roller 51 by L1+L2). That is, the recording medium is conveyed toward the downstream side from the upstream side until the trailing edge of the recording medium reaches the upstream end of the permitted region B.

Thereafter, as illustrated in Part (c) of FIG. 14, the recording medium is conveyed by L1 toward the upstream side in the conveyance direction for a feed preparation operation. At this time, the conveying roller 51 and the trailing edge of the recording medium are separated by L2 based on the calculation. Accordingly, even in a case where the edge detecting lever 57 has had a detection error of L2, the trailing edge of the recording medium will not be nipped by the conveying roller 51 again. Thereafter, a feed operation is performed, so that the conveying roller 51 and the discharging roller 53 are each rotationally driven in the forward direction, thereby discharging the recording medium onto the discharging unit 8.

Figure 15:
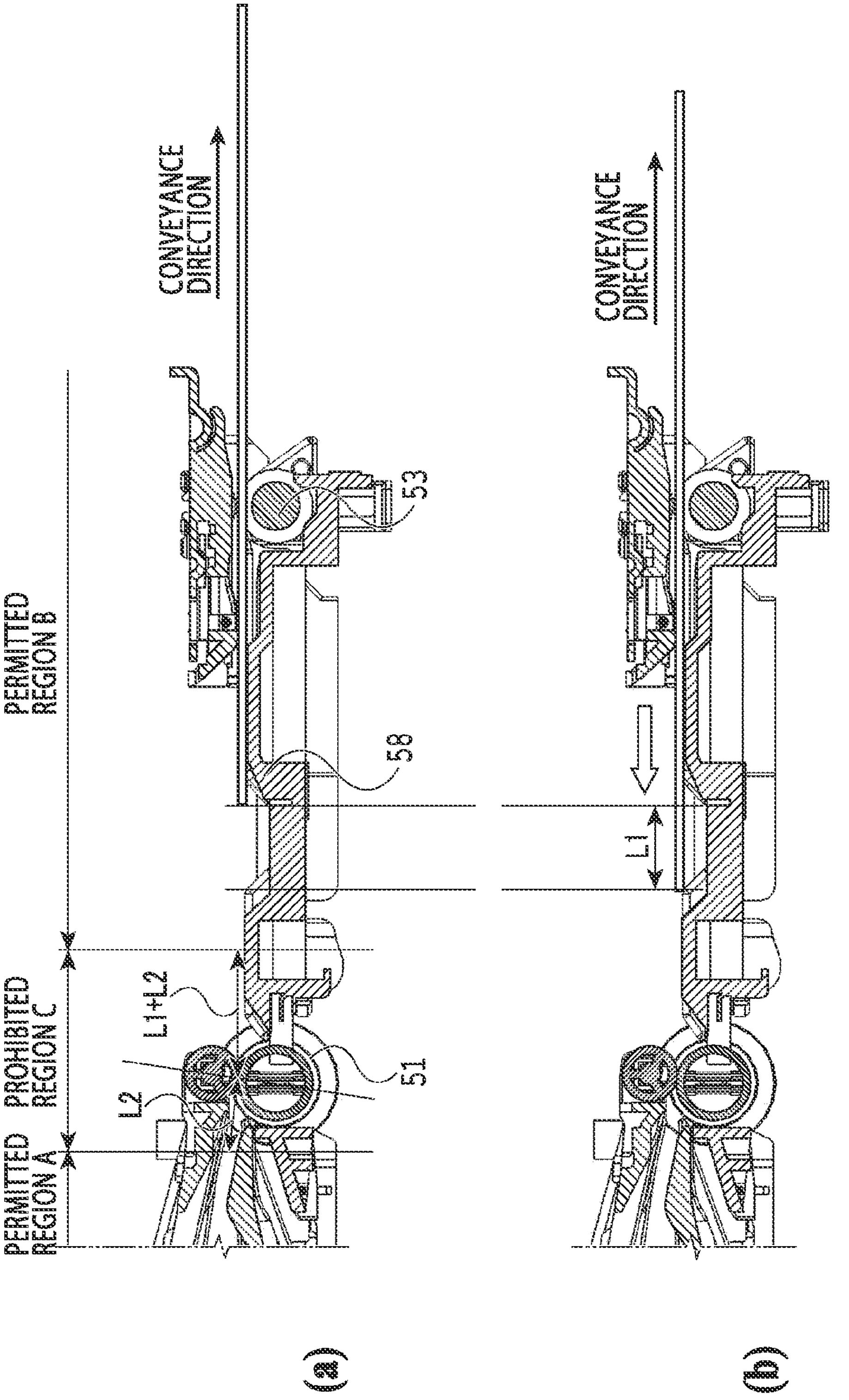
FIG. 15 is an explanatory view of a feed-discharge operation in a case where recording is completed at a permitted region.

Next, a case where a recording operation has ended with the trailing edge of the recording medium situated within a permitted region will be described. FIG. 15 shows cross-sectional views of the conveying unit and its periphery illustrating the movement of a recording medium after a recording operation ended with the trailing edge of the recording medium situated within the permitted region B.

Part (a) of FIG. 15 illustrates a state immediately after the end of the recording operation where the trailing edge of the recording medium is situated at a position separated from the conveying roller 51 by more than L1+L2 toward the downstream side. Since the trailing edge of the recording medium and the conveying roller 51 are separated by more than L1+L2, the recording medium is not likely to be nipped by the conveying roller 51 again even in a case where the recording medium is conveyed toward the upstream side by L1 in a feed preparation operation. Thus, as illustrated in Part (b) of FIG. 15, the recording medium can be conveyed by L1 toward the upstream side in the conveyance direction immediately after the completion of the recording operation for a feed preparation operation.

Figure 16A:
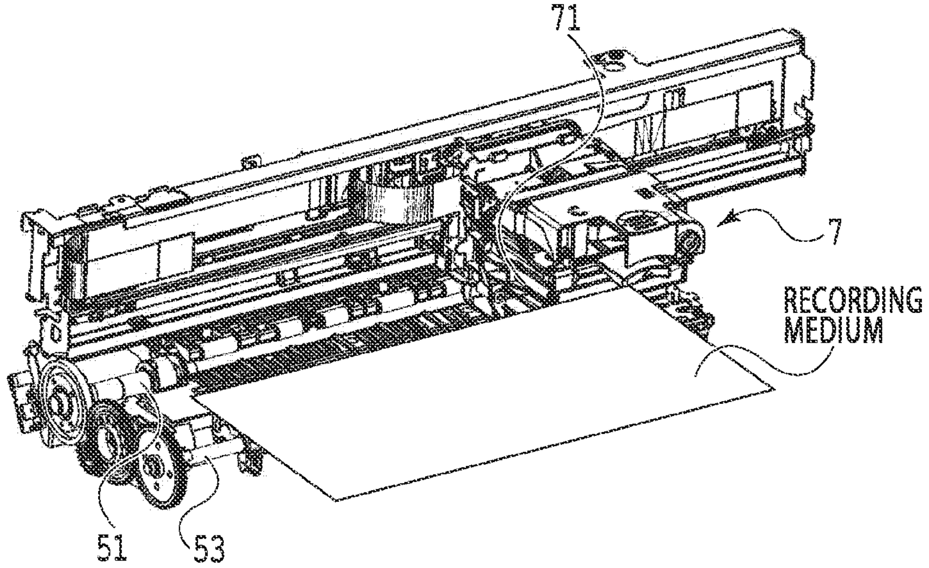
FIGS. 16A and 16B are explanatory views of an operation in a case where a recording unit is present directly above a recording medium.
Figure 16B:
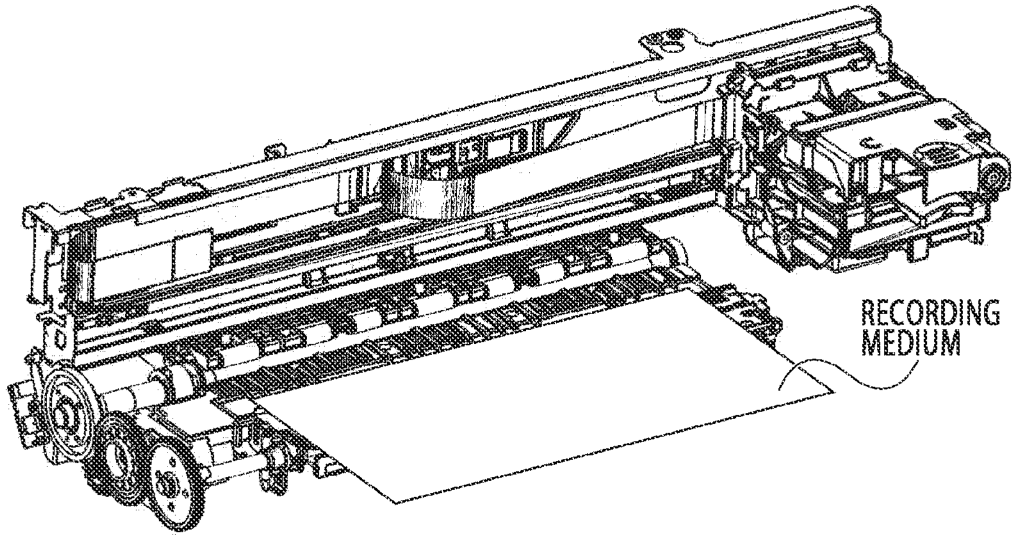

FIGS. 16A and 16B are perspective views of a part of the conveying unit illustrating an operation in a case where a recording medium is located directly below the recording unit. After the completion of a recording operation, the recording head 71 in the recording unit 7 is sometimes situated immediately above the recording medium, as illustrated in FIG. 16A. The recording medium immediately after the completion of the recording operation may be curled due to the inks or the like such that an edge portion is raised, for example. Also, after the trailing edge of the recording medium passes the conveying roller 51, the recording medium is supported only by the discharging roller 53, and the trailing edge of the recording medium may therefore be raised. In a case where the recording medium in such a state is conveyed toward the upstream in the conveyance direction, the curled edge portion may touch the recording head 71 and cause ink soiling or a paper jam. For this reason, as illustrated in FIG. 16B, the recording head 71 is moved in the direction of the arrow to retract from immediately above the recording medium, and then a feed preparation operation is performed. This makes it possible to prevent ink soiling and a paper jam.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (MD), or Blu-ray Disc (BD)™), a flash memory device, a memory card, and the like.

According to the present disclosure, it is possible to achieve both shortening of the time required for a recording operation and prevention of conveyance abnormality such as a paper jam.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-160335, filed Oct. 4, 2022, which is hereby incorporated by reference herein in its entirety.

What is claimed is:

1. A recording apparatus comprising:

a feeding roller configured to feed a recording medium;

a conveyance path through which the recording medium fed by the feeding roller is caused to pass from an upstream side to a downstream side in a conveyance direction;

a conveying roller disposed on the conveyance path and configured to rotate in a first direction for conveying the recording medium to the downstream side and a second direction for conveying the recording medium to the upstream side;

a detecting unit configured to detect an edge of the recording medium; and a control unit configured to execute first control for conveying the recording medium toward the upstream side by rotating the conveying roller in the second direction and second control for conveying the recording medium toward the downstream side by rotating the conveying roller in the first direction, wherein the conveyance path includes a first region and a second region different from the first region, and when a second recording medium subsequent to the recording medium is fed by the feeding roller, (1) in a case where a position of a trailing edge of the recording medium detected by the detecting unit is situated within the first region, the control unit executes the first control, and (2) in a case where the position of the trailing edge of the recording medium detected by the detecting unit is situated within the second region, the control unit executes the second control until the trailing edge of the recording medium reaches the first region and then rotates the conveying roller in the second direction.

2. The recording apparatus according to claim 1, wherein the second region is a region where a recording medium is not permitted to be conveyed toward the upstream side.

3. The recording apparatus according to claim 1, wherein the conveyance path is divided into a plurality of regions at different positions in the conveyance direction, and each of the plurality of regions is designated as the first region or the second region.

4. The recording apparatus according to claim 3, wherein a most downstream region among the plurality of regions is designated as the first region.

5. The recording apparatus according to claim 3, wherein a first plurality of regions at different positions in the conveyance direction are each designated as the first region, and a second plurality of regions at different positions in the conveyance direction are each designated as the second region.

6. The recording apparatus according to claim 1, further comprising:

a discharging unit configured to discharge a recording medium conveyed by the conveying roller; and a driving unit configured to drive the feeding roller and the conveying roller, wherein the upstream side of the conveyance path is a side closer to the feeding roller, and the downstream side of the conveyance path is a side closer to the discharging unit.

7. The recording apparatus according to claim 1, wherein in a feed preparation operation, the conveying roller is rotationally driven by a predetermined rotation amount in the second direction.

8. The recording apparatus according to claim 7, wherein a downstream side of the conveying roller is designated as the second region.

9. The recording apparatus according to claim 7, wherein in a feed-discharge operation, an operation of discharging the recording medium remaining in the conveyance path and an operation of feeding the second recording medium from the feeding roller to the conveying roller are both executed simultaneously.

10. The recording apparatus according to claim 9, further comprising a recording unit including a recording head configured to reciprocally move in a direction orthogonal to the conveyance direction of a recording medium, wherein in a case where a trailing edge of a recording medium is situated within the recording unit, the control unit executes the feed preparation operation after causing the recording head to retract from above the recording medium.

11. The recording apparatus according to claim 9, further comprising:

a driving unit configured to drive the feeding roller and the conveying roller, wherein after the detecting unit detects a trailing edge of a recording medium, the control unit calculates a position of the trailing edge of the recording medium based on a position of the detecting unit in the conveyance direction and a driving amount of the driving unit after the detection until completion of recording.

12. The recording apparatus according to claim 9, further comprising:

a driving unit configured to drive the feeding roller and the conveying roller, wherein in the feed-discharge operation, the control unit calculates a position of a trailing edge of a recording medium based on length information of the recording medium and a driving amount of the driving unit after feed of the recording medium having completed being recorded until completion of the recording.

13. The recording apparatus according to claim 12, wherein the length information is obtained and stored in a storage unit in a case of executing recording on a first one of recording media.

14. A method of controlling a recording apparatus including:

a feeding roller configured to feed a recording medium;

a conveyance path through which the recording medium fed by the feeding roller is caused to pass from an upstream side to a downstream side in a conveyance direction, the conveyance path including a first region and a second region different from the first region;

a conveying roller disposed on the conveyance path and configured to rotate in a first direction for conveying the recording medium to the downstream side and a second direction for conveying the recording medium to the upstream side;

a detecting unit configured to detect an edge of the recording medium; and a control unit configured to execute first control for conveying the recording medium toward the upstream side by rotating the conveying roller in the second direction and second control for conveying the recording medium toward the downstream side by rotating the conveying roller in the first direction, the control method comprising, when a second recording medium subsequent to the recording medium is fed by the feeding roller, (1) in a case where a position of a trailing edge of the recording medium detected by the detecting unit is situated within the first region, the control unit executing the first control, and (2) in a case where the position of the trailing edge of the recording medium detected by the detecting unit is situated within the second region, the control unit executing the second control until the trailing edge of the recording medium reaches the first region and then rotating the conveying roller in the second direction.

15. The control method according to claim 14, wherein the second region is a region where a recording medium is not permitted to be conveyed toward the upstream side.

16. The control method according to claim 14, wherein the conveyance path is divided into a plurality of regions at different positions in the conveyance direction, and each of the plurality of regions is designated as the first region or the second region.

17. The control method according to claim 16, wherein a most downstream region among the plurality of regions is designated as the first region.

18. The control method according to claim 16, wherein
- a first plurality of regions at different positions in the conveyance direction are each designated as the first region, and
- a second plurality of regions at different positions in the conveyance direction are each designated as the second region.

19. The control method according to claim 14, wherein the recording apparatus further includes:
- a discharging unit configured to discharge a recording medium conveyed by the conveying roller; and
- a driving unit configured to drive the feeding roller and the conveying roller, wherein
- the upstream side of the conveyance path is a side closer to the feeding roller, and the downstream side of the conveyance path is a side closer to the discharging unit.

* * * * *